(12) United States Patent
Torii

(10) Patent No.: US 7,034,284 B2
(45) Date of Patent: Apr. 25, 2006

(54) OPTICAL SENSOR HAVING LIGHT PROJECTING PRISM

(75) Inventor: Tomonari Torii, Settsu (JP)

(73) Assignee: Keyence Corporation, Osaka (JP)

( * ) Notice: Subject to any disclaimer, the term of this patent is extended or adjusted under 35 U.S.C. 154(b) by 18 days.

(21) Appl. No.: 10/745,982

(22) Filed: Dec. 29, 2003

(65) Prior Publication Data

US 2004/0136100 A1 Jul. 15, 2004

(30) Foreign Application Priority Data

Dec. 25, 2002 (JP) ............................. 2002-373655
May 6, 2003 (JP) ............................. 2003-128413

(51) Int. Cl.
*G01N 21/64* (2006.01)
(52) U.S. Cl. ...................... 250/239; 250/221
(58) Field of Classification Search ............... 250/221, 250/226, 459.1, 461.1, 461.2; 359/196
See application file for complete search history.

(56) References Cited

U.S. PATENT DOCUMENTS

| 4,260,883 | A | * | 4/1981 | Onoda | 250/226 |
| 5,796,112 | A | * | 8/1998 | Ichie | 250/458.1 |
| 5,997,163 | A | * | 12/1999 | Brown | 362/553 |
| 6,088,110 | A | * | 7/2000 | Rudd | 356/630 |
| 6,567,366 | B1 | * | 5/2003 | Kim | 369/112.21 |

FOREIGN PATENT DOCUMENTS

| JP | 7-63920 A | 3/1995 |
| JP | 7-113688 A | 5/1995 |
| JP | 7-146115 A | 6/1995 |
| JP | 7-208939 A | 8/1995 |
| JP | 7-209507 A | 8/1995 |
| JP | 9-251104 A | 9/1997 |
| JP | 2002-195880 A | 7/2002 |
| JP | 2002-198568 A | 7/2002 |

* cited by examiner

*Primary Examiner*—Thanh X. Luu
*Assistant Examiner*—Tony Ko
(74) *Attorney, Agent, or Firm*—Smith Patent Office

(57) ABSTRACT

An optical sensor projects light rays emanating from a light emitting element that are collimated by a lens and reflected by a mirror and then directed to a light projecting prism. The collimated light rays incident upon the prism are refracted at an incident surface and come out from the prism through a light exit surface so as thereby to be projected into the field of detection. Light rays passing through the field of detection are directed to a light receiving prism. The light rays incident upon the light receiving prism through a light incident surface are reflected by a light exit surface and then come out from the light receiving prism. The outgoing light rays are received and converted into an electric signal by a light receiving element.

12 Claims, 21 Drawing Sheets

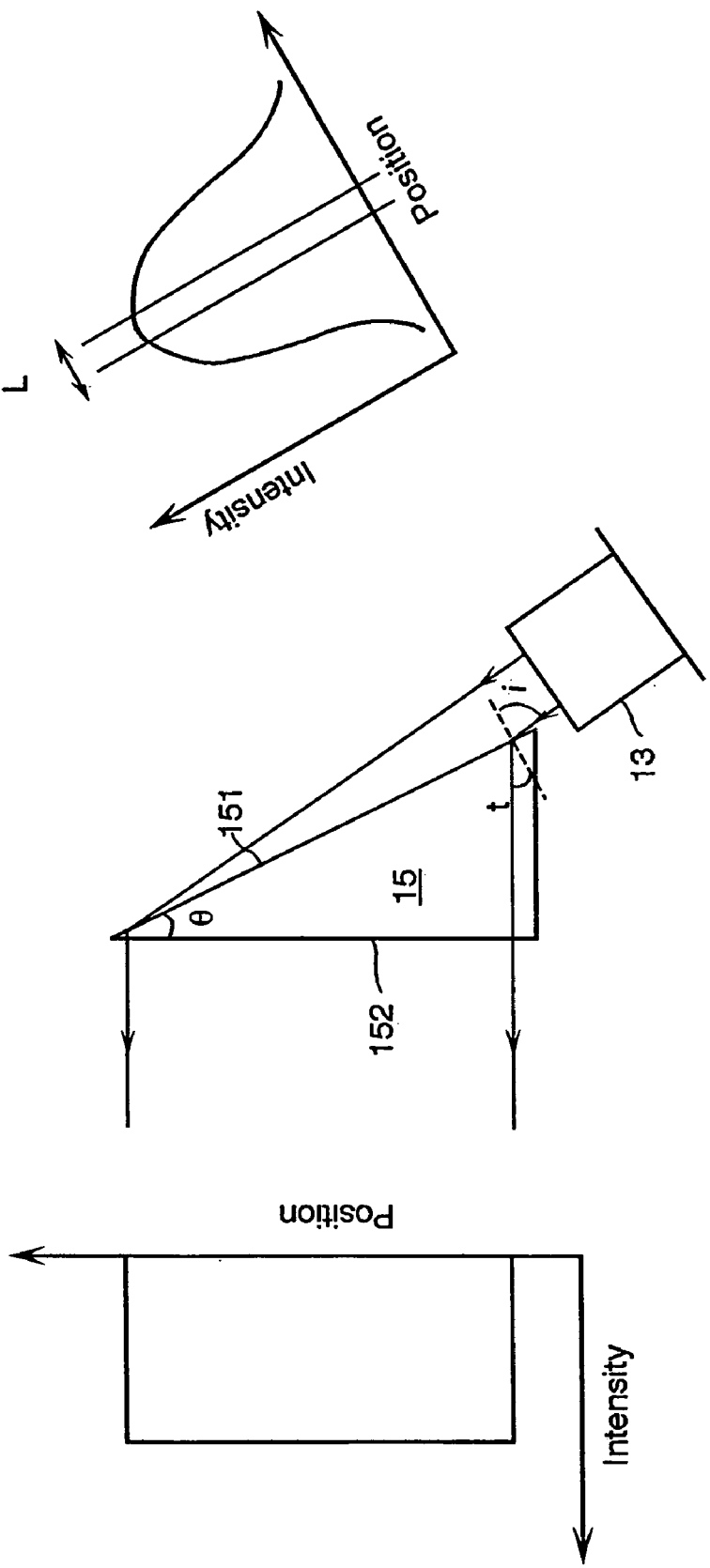

OPTICAL SENSOR HAVING LIGHT PROJECTING PRISM

BACKGROUND OF THE INVENTION

1. Field of the Invention

The present invention relates to an optical sensor for projecting light rays into a field of detection and detecting information on a subject in the field of detection based on light rays returning from the field of detection.

2. Discussion of the Related Art

There have been various optical sensors such as photoelectric sensors and optical scanners for detecting information on a subject or subjects such as the presence or absence of the subject in a specified field of detection and measurements of the subject, a position of the subject, a configuration of the subject, a distance between the subjects, or a graphical or pictorial image applied to the subject by projecting light rays into the field of detection and detecting an intensity distribution of the light rays that are reflected by or transmit through the subject in the field of detection. Before describing the present invention in detail, reference is made to FIGS. 21 and 22 for the purpose of providing a brief background that will enhance an understanding of the optical sensor.

Referring to FIG. 21 schematically showing a basic construction of a conventional transmission optical sensor, the optical sensor principally comprises a light projection unit 50 and a light detection unit 60. The light projection unit 50 includes a light projection circuit 51, a light emitting element 52 and a projection lens 53. The light projection circuit 51 drives the light emitting element 52 to emit light rays. The light rays emanating from the light emitting element 52 are collimated and then projected on a transparent subject 500 in a specified field of detection 501 by the projection lens 53. The collimated light rays pass through the subject 500 and travel to the light receiving element 60. The light receiving unit 60 includes a detection circuit 61, a light receiving element 62 and a focusing lens 63. The light rays passing through the subject 500 in the field of detection 501 are focused on the light receiving element 62 by the focusing lens 63. The light receiving element 62 converts an intensity of light rays incident thereupon into a voltage signal. The detection circuit 61 detects the presence or absence of the subject 500, dimensions of the subject 500 or a configuration of the subject 500 based on the electric signal from the light receiving element 62.

FIG. 22 schematically shows one of the conventional optical sensors that is disclosed in Japanese Unexamined Patent Publication No. 7-146115, where a light emitting element 101 such as a light emitting diode (LED) emits light rays. A light guide fiber bundle 102 guides the light rays emanating from the light emitting element 101 toward a collimator lens 103. The light rays exiting the light guide fiber bundle 102 are collimated as a parallel beam 112 having a specified beam width by the collimator lens 103 and then they are reflected by a reflection mirror 104. The light rays 112 are projected into a field of detection in which a subject 105 is located and they are partially blocked by the subject 105.

A light-sensitive detector 106 receives the remaining part of the light rays and converts the light rays incident thereupon into an electric signal representative of an intensity of the light rays. A comparator circuit 107 compares a level of the electric signal with a level of a reference signal that is provided by a reference signal generating circuit 108 to determine the presence or absence of the subject 105 in the field of detection based on a result of the comparison and provides a signal representative of a result of the determination.

Generally, a beam of light rays emanating from the LED shows an intensity distribution that is high at a center of the beam and gradually lowers when moving away from the center as shown in FIG. 22. In other words, the light rays projected into the field of detection and received by the light-sensitive detector 106 are uneven and different in intensity depending upon distances from a center axis of the beam. Therefore, if the subject 105 is in a position far from the center axis of the beam where the light rays are low in intensity, the reduction in intensity of the light rays incident upon the light-sensitive detector 106 that is caused by the subject in the field of detection is small. This possibly leads to deterioration of the detection sensitivity and accuracy in some object positions and, in addition, to a failure to detect sizes of some of the subjects 105 in subject positions even though the subjects 105 are the same in size.

In order to provide a wide beam of light rays, it is essential to use a collimator lens having a large aperture, desirably a glass lens, that is comparatively expensive due to the difficulty in precise surface finishing. Although a plastic lens is inexpensive, nevertheless, it is not preferred to use the plastic lens in light of an occurrence of thermal deformation.

A parallel laser beam linear sensor has been known in which a laser diode is used as the light emitting element 101. In this kind of parallel laser beam linear sensor, since the beam of laser rays is strong in intensity, it is allowed to utilize laser rays in a central range of comparatively uniform intensity distribution with a consequence that a parallel beam of laser rays having a comparatively uniform intensity distribution is projected into the field of detection. However, the parallel laser beam linear sensor in which a laser diode is used as the light emitting element 101 is inevitably bulky and expensive.

Referring to FIG. 23 which is showing another one of the conventional optical sensors that is disclosed in Japanese Unexamined Patent Publication No. 7-146115, light rays emanating from a light emitting element 201 are guided to a collimator lens 203 through a light guide fiber bundle 202. The outgoing light rays 211 from the light guide fiber bundle 202 are collimated by the collimator lens 203 and directed as parallel beams of light rays 212 toward a reflective member 213 having a number of total reflection facets 214. The light rays incident upon the reflective member 213 are reflected and divided into a number of parallel beams of light rays 215 by the total reflection facets 214 and then projected into a field of detection. The total reflection facets 214 are arranged so that the beam width of the incoming parallel beams of light rays W1 is expanded to a total width of the outgoing parallel beams of light rays W2.

Since the optical sensor projects expanded parallel beams of light rays into the field of detection, it is allowed to utilize light rays emanating from the light emitting element 201 in a central range with the consequence that a parallel beam of light rays that are distributed almost uniformly in intensity is projected into the field of detection. Therefore, a subject in the field of detection is illuminated with light rays having a uniform intensity irrespective of the subject's position.

However, the outgoing light rays from the reflective member 213 inevitably includes crests and bottoms of intensity distribution occurring correspondingly to pitches at which the reflection facets 214 are arranged. In consequence, since the light rays projected into the field of detection are uneven and different in intensity depending upon distances from a center axis of the beams, if a subject is in a position where light rays are low in intensity, a reduction in intensity of the light rays caused by the subject in the field of detection is small. This possibly leads to deterioration of detection sensitivity and accuracy in some object positions. In addition, light rays emanating from the light emitting element 201 corresponding in position to the bottoms of the intensity distribution are directed not to a subject but reflected in other directions. This inflicts a loss upon light intensity with the consequence that a projection light intensity is lowered across the field of detection, resulting in deterioration of detection sensitivity.

SUMMARY OF THE INVENTION

It is an object of the present invention to provide an optical sensor that projects a wide beam of light rays that are strong in intensity and uniform in intensity distribution toward the field of detection.

It is another object of the present invention to provide an optical sensor that receives a wide beam of light rays that are strong in intensity and uniform in intensity distribution from the field of detection.

It is a further object of the present invention to provide an optical sensor that is smaller and manufactured at a low cost.

The foregoing objects of the present invention are achieved by an optical sensor that projects light rays into a field of detection and detects information of a subject in the field of detection based on light rays returning from the field of detection. According to a primary embodiment of the present invention, the optical sensor comprises light source means for generating light rays, reflection means for reflecting the light rays emanating from the light source means, a light projecting prism for refracting the light rays reflected by the reflection means and projecting the light rays into the field of detection. The light projecting prism is shaped so as to refract the light rays incident upon a first surface at an angle less than 90° and to allow the light rays to come out from the prism without being refracted through a second surface intersecting the first surface at a specified angle less than 90°.

According to the optical sensor, a beam of light rays emanating from the light emitting element and reflected by the reflection means enters the light projecting prism at an angle less than 90° and is refracted by the light projecting prism at the first surface and comes out from the light projecting prism through the second surface, so that the beam of light rays coming out from the light projecting prism is expanded in beam width resulting from the refraction at the first surface.

The optical sensor is capable of projecting a wide beam of light rays that is strong in intensity and uniform in intensity distribution into the field of detection by using light rays in a central range of comparatively uniform intensity distribution. Therefore, the optical sensor detects accurate information on a subject in the field of detection. In addition, the light projecting prism is easily manufactured at a low cost because of its simple shape and the use of the light projecting prism contributes to lowering the manufacturing cost of the optical sensor.

Furthermore, the optical sensor allows a downsized light projecting prism to be installed for expanding the beam width of the outgoing light rays resulting from making the light rays enter the light projecting prism at an incident angle less than 90° through the first surface. This helps to downsize the optical sensor. As the light projecting prism is used with the consequence that parallelism of light rays is improved, the optical sensor is capable of projecting a beam of light rays with high degree of parallelism into the field of detection. The width of an outgoing beam of light rays from the light projecting prism is regulated as appropriate by adjusting an incident angle at which a beam of light rays enters the light projecting prism. Since the light rays emanating from the light emitting element are reflected by the reflecting means and then directed to the light projecting prism, the light emitting element is allowed to be positioned within a space spatially defined by a width of the second surface of the light projecting prism. This configuration contributes to reduce the width of the optical sensor.

The light projecting prism is shaped so that light rays incident upon the light projecting prism at an angle less than 90° are refracted at the first surface and come out from the light projecting prism at a right angle to the second surface. This configuration of the light projecting prism allows light rays incident upon the light projecting prism to come out from the light projecting prism keeping a beam width of the light rays expanded due to refraction at the first surface.

The optical sensor may further comprise a collimator lens for collimating the light rays emanating from the light source means and directing the collimated light rays toward the first surface of the light projecting prism. A parallel beam of light rays, that enters the light projecting prism at an angle less than 90°, comes out from the light projecting prism as a parallel beam having an expanded beam width.

The optical sensor is provided with a right triangle circuit board with a drive circuit for the light source formed thereon and is disposed with its hypotenuse facing the hypotenuse of the light projecting prism in the housing. This layout leads to efficient utilization of an interior space of the housing with the consequence that the optical sensor is further downsized.

The light source means is positioned within a space spatially defined by a width of the second surface of the light projecting prism. This layout leads to a reduction in the width of the housing in a direction of a beam width.

The optical sensor is further provided with light shielding means disposed between the light source means and the first surface of the light projecting prism. The shielding means prevents light rays reflected by the reflection means and then by the circuit board from turning to stray light rays and also prevents the circuit board from mechanically interfering with the light projecting prism if the circuit board is flexible.

The optical sensor is further equipped with light detection means comprising a light receiving element and a condenser or focusing lens. The focusing lens focuses the light rays returning from the field of detection on the light receiving element that converts the intensity of the light rays incident thereupon into an electric signal representative of the intensity. This light detection means is capable of detecting a wide beam of light rays although simple in structure. In consequence, while the optical sensor is downsized, alignment of an optical system of the optical sensor is alleviated. This also leads to a low manufacturing cost of the optical sensor.

According to another embodiment of the present invention, the optical sensor comprises light projection means for projecting light rays into the field of detection and light detection means for detecting information of a subject in the field of detection based on light rays returning from the field of detection. The light detection means comprises a housing with a window formed in one wall of the housing to allow the light rays returning from the field of detection to enter the housing, a transparent member attached to the housing to cover the window and having a number of halftone dots formed thereon for partly diffusively reflecting and partly transmitting the light rays entering the housing through the window, a light opaque member disposed in close proximity to the transparent member in the housing and having an elongated opening formed therein to restrain a beam width of the light rays entering the housing through the transparent member, and a light receiving element disposed in the housing to receive the light rays entering the housing through the transparent member. The halftone dots are distributed over the transparent member so that dot density varies so as to make an intensity distribution of the light rays passing through said transparent approximately uniform.

The light rays passing through the opening and entering the light detection means are partly diffusively reflected by the halftone dots of the halftone dot filter and partly pass through the remaining part of the halftone dot filter except the halftone dots. As the dot density of the halftone dot filter varies, in steps or linearly, so as to make an intensity distribution of incoming light rays approximately uniform, the light rays incident upon the light receiving element are uniform in intensity. This leads to accurate detection of information on the subject.

Further, as the light opaque member with an elongated opening formed therein restrains a beam width of the light rays that enter the housing through the transparent member, the light rays impinging on the transparent window cover form light spots at opposite sides of the elongated opening of the light opaque member. Axial adjustment between the light projection means and the light detection means is easily performed by forming uniform sized light spots at opposite sides of the opening of the light opaque member. In addition, it is easy to recognize and correct axial displacement between the light projection means and the light detection means based on equality of these spots. The transparent member with a halftone dot filter formed thereon and the light opaque member with an elongated opening formed therein are simple in structure and manufactured at a low cost. Therefore, the optical sensor is lowered in manufacturing cost.

BRIEF DESCRIPTION OF THE DRAWINGS

The above and other objects and features of the present invention will be clearly understood from the following detailed description when read with reference to the accompanying drawings, wherein the same numeral numbers have been used to denote same or similar parts or mechanisms throughout the drawings, and in which:

FIGS. 3(A), 3(B) and 3(C) are diagrams explaining the light principles of the optical sensor;

DETAILED DESCRIPTION OF THE PREFERRED EMBODIMENTS

Figure 1:
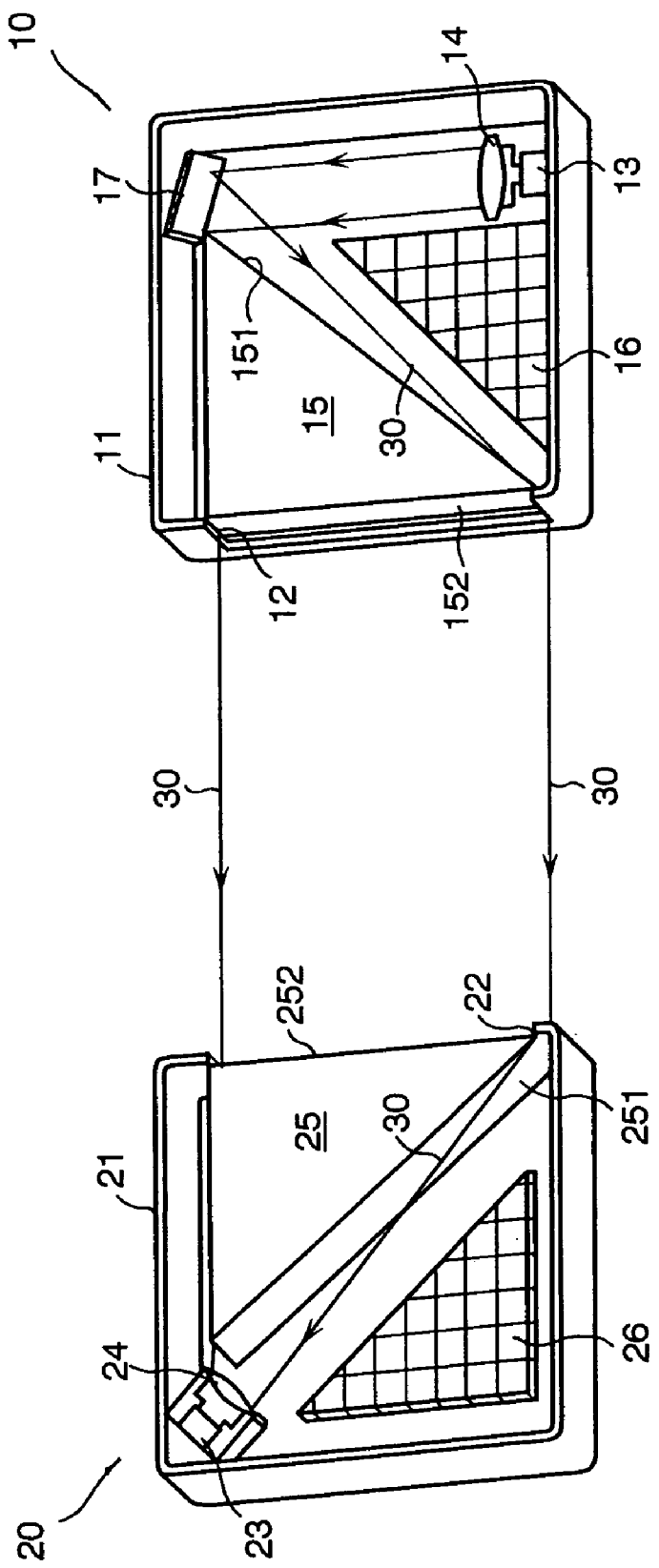
FIG. 1 is a perspective view of an internal structure of an optical sensor according to an embodiment of the present invention.

Referring to the drawings in detail, and, in particular, to FIG. 1 showing an internal structure of an optical sensor according to an embodiment of the present invention, the optical sensor comprises a light projection unit 10 and a light detection unit 20. The light projection unit 10 has a generally square housing 11 with an elongated window 12 formed in one of the walls thereof. In the housing 11, there are arranged a light source, namely a light emitting element 13 such as a laser diode, a collimator lens 14, a light projecting prism 15 made of a right angle glass block, a circuit board 16 having a right triangle shape on which a drive circuit for the light emitting element 13 is formed, and a reflecting mirror 17. Specifically, the light emitting element 13 is positioned in one of the corners of the housing so as to emit light rays. The collimator lens 14 collimates the light rays from the light emitting element 13 and directs the light rays toward the reflecting mirror 17 along one wall of the housing 11 opposite to the wall in which the window 12 is formed. The reflecting mirror 17 is positioned in another one of the corners of the housing 11 so as to reflect the light rays incident thereupon at an angle of 45°. The light projecting prism 15 is positioned in the housing 11 so that one of two side surfaces crossing each other at a right angle forms a light exit surface 152, and is put adjacent to the window 12 and a hypotenuse surface forms a light incident surface 151, and lies almost along a diagonal line in the housing 11. The circuit board 16 is positioned in the housing 11 so that an oblique line faces the hypotenuse surface, i.e. the light incident surface 151, of the light projecting prism 15.

The light detection unit 20 has a generally square housing 21 with an elongated window 22 formed in one of walls thereof. In the housing 21, there are arranged a light receiving element 23 such as a photodiode, a focusing lens 24, a light receiving prism 25 made of a right light projecting glass block, and a circuit board 26 having a right light projecting on which a processing circuit operative to process a photo-electric signal from the light receiving element 23 and to provide an output signal is formed. Specifically, the light receiving element 23 is positioned in one of corners so as to lay its optical axis almost along a diagonal line of the housing 21. The light receiving prism 25 is positioned in the housing 11 so that one of two surfaces crossing each other at a right angle forms a light incident surface 252 and is put adjacent to the window 22 and a hypotenuse surface forms a light exit surface 251 and lies almost along the diagonal line of the housing 21. The focusing lens 24 focuses the light rays emanating from the light receiving prism 25 on the light receiving element 23. The circuit board 26 is positioned in the housing 11 so that an oblique line faces the hypotenuse surface, i.e. the light exit surface 251, of the light receiving prism 25.

The light rays 30 emanating from the light emitting element 13 are collimated by the collimator lens 14 and reflected by the reflecting mirror 17, and then directed to the light projecting prism 15. The collimated light rays 30 incident upon the light projecting prism 15 through the light incident surface 151 are refracted at the light incident surface 151 and come out from the light projecting prism 15 through the light exit surface 152 into the field of detection. The collimated light rays 30 entering the light detection unit 20 are focused on the light receiving element 23 by the focusing lens 24.

Figure 4A:
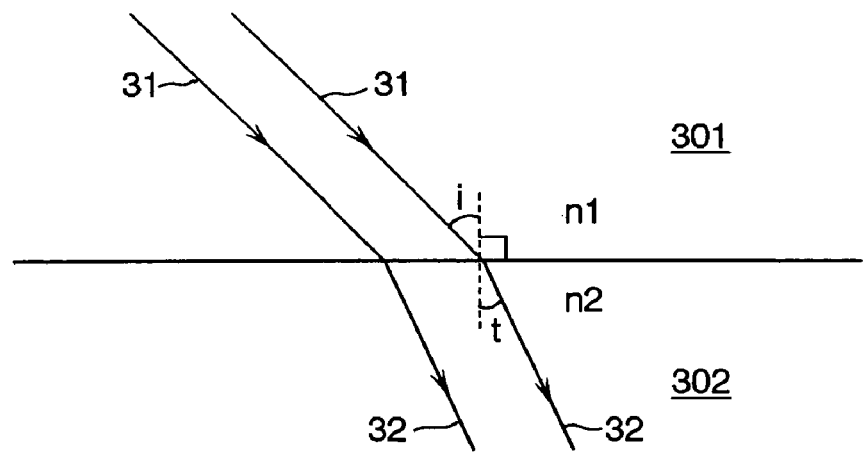
FIGS. 4(A) and 4(B) are diagrams explaining reflection of the light rays.
Figure 4B:
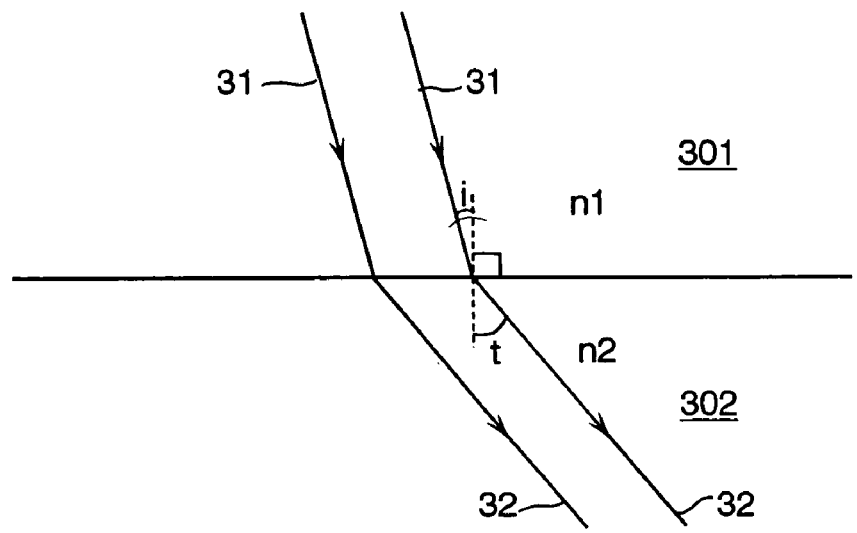

The principle of the optical sensor will be described with reference to FIGS. 3(A), 3(B), 3(C) and 4. FIG. 3(A) shows an intensity distribution of light rays coming out from the light projecting prism 15. FIG. 3(B) shows the relationship between the light rays incident upon the light projecting prism 15 and the light rays coming out from the light projecting prism 15. FIG. 3(C) shows an intensity distribution of the light rays emanating from the light emitting element 13. In FIG. 3(B), the collimator lens 14 is omitted. FIGS. 4(A) and 4(B) show the refraction of the light rays.

In FIGS. 4(A) and 4(B), wherein n1 and n2 are taken as refraction indexes of mediums 301 and 302, respectively, when a light ray 31 enters the medium 302 having a refraction index n2 from the medium 301 having a refraction index n1, the light rays 32 are refracted by the interface between the mediums 301 and 302. Then, the following relationship holds between an incident angle i and a refracting angle t of the light rays at the interface $n1 \sin(i) = n2 \sin(t)$ Therefore, when the refraction index n1 of the medium 301 is smaller than the refraction index n2 of the medium 302, the incident angle i is greater than the refracting angle t as shown in FIG. 4(A). On the other hand, when the refraction index n1 of the medium 301 is greater than the refraction index n2 of the medium 302, the incident angle i is smaller than the refracting angle t as shown in FIG. 4(B).

As shown in FIG. 3(B), the light emitting element 13 is positioned so as to emit light rays having an axis making an angle less than 90° with the light incident surface 151 of the light projecting prism 15. According to the position of the light emitting element 13, the light rays emanating from the light emitting element 13 enter obliquely the light projecting prism 15 at the light incident surface 151. Since the refraction index of the light projecting prism 15 is greater than that of air, the light rays incident upon the light incident surface 151 of the light projecting prism 15 are refracted at an angle t smaller than an incident angle i as shown in FIG. 4(A). In consequence, the light rays emanating from the light emitting element 13 are expanded in width through refraction by the light incident surface 151 of the light projecting prism 15. In this instance, the light projecting prism 15 has an angle θ between the light incident surface 151 and the light exit surface 152 so that light rays incident upon the light incident surface 151 at an incident angle i come out from the light exit surface 152 at a right angle thereto.

As shown in FIG. 3(C), the light rays emanating from the light emitting means 13 are distributed almost evenly in intensity in a certain central zone L around an axis of a bundle of the light rays and are reduced in intensity when moving away from the axis. Therefore, the light projecting prism 15 produces a wide beam of light rays having an even intensity distribution as shown in FIG. 3(A) by utilizing and expanding the light rays in the center zone L. In this instance, because a measurement of the beam of light rays expanded by the light projecting prism 15 depends upon the incident angle of the light rays incident upon the light projecting prism 15, the beam of light rays is infinitely expanded in principle by setting the incident angle i as close to 90° as possible.

Further, it is allowed to cause the light rays to come out of the light projecting prism 15 through the light exit surface 152 keeping a beam width of the light rays expanded resulting from refraction of the light rays at the light incident surface 151 by setting the incident angle i of light rays upon the light incident surface 151 or the angle θ between the light incident surface 151 and the light exit surface 152 so as to prevent the light rays from being refracted at the light exit surface 152.

As seen in the optical sensor shown in FIG. 1, it is preferred to collimate light rays emanating from the light emitting element 13 by the collimator lens 14 and then to make the collimated right rays enter the light projecting prism is through the light incident surface 151. This makes it possible to provide a wide beam of collimated light rays 30.

The following description is directed to the way to improve the degree of parallelism of the light rays by using the light projecting prism 15 in the optical sensor with reference to FIGS. 5(A), 5(B) and 5(C) and FIGS. 6(A) and 6(B) showing the mechanism for improving the degree of parallelism of the light rays in which n1 and n2 (n1<n2) are taken as refraction indexes of air and the light projecting prism 15, respectively.

Figure 5A:
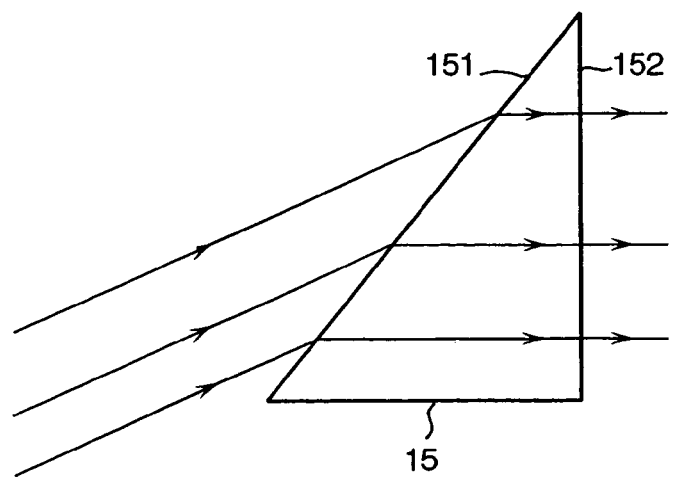
FIGS. 5(A), 5(B) and 5(C) are diagrams explaining how to improve the degree of parallelism of the light rays by the use of a prism.
Figure 5B:
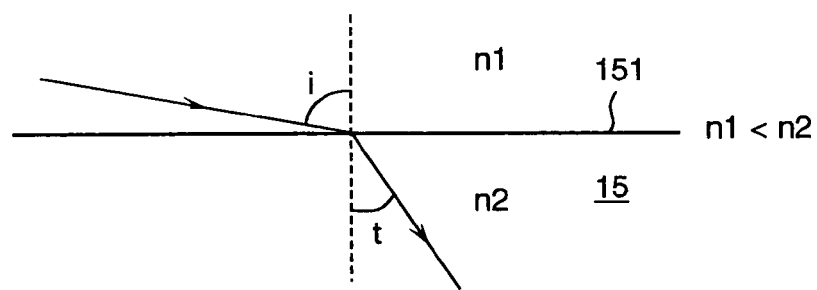
Figure 5C:
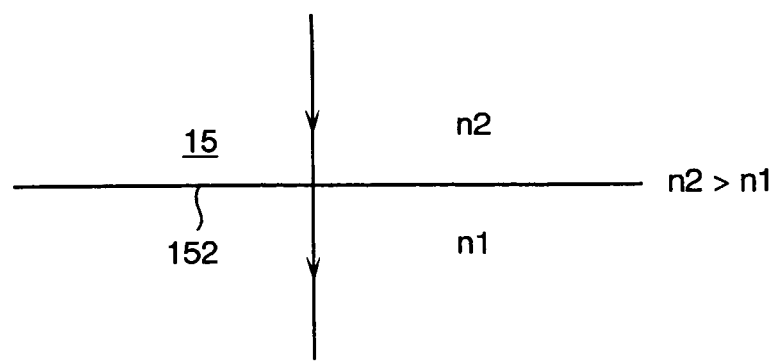
Figure 6A:
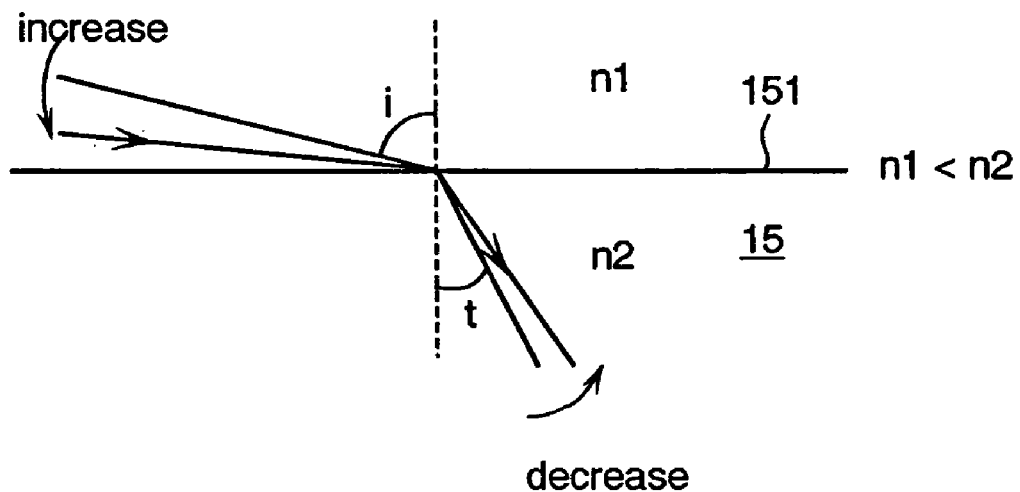
FIGS. 6(A) and 6(B) are diagrams explaining the cause of the improvement of the degree of parallelism of the light rays.
Figure 6B:
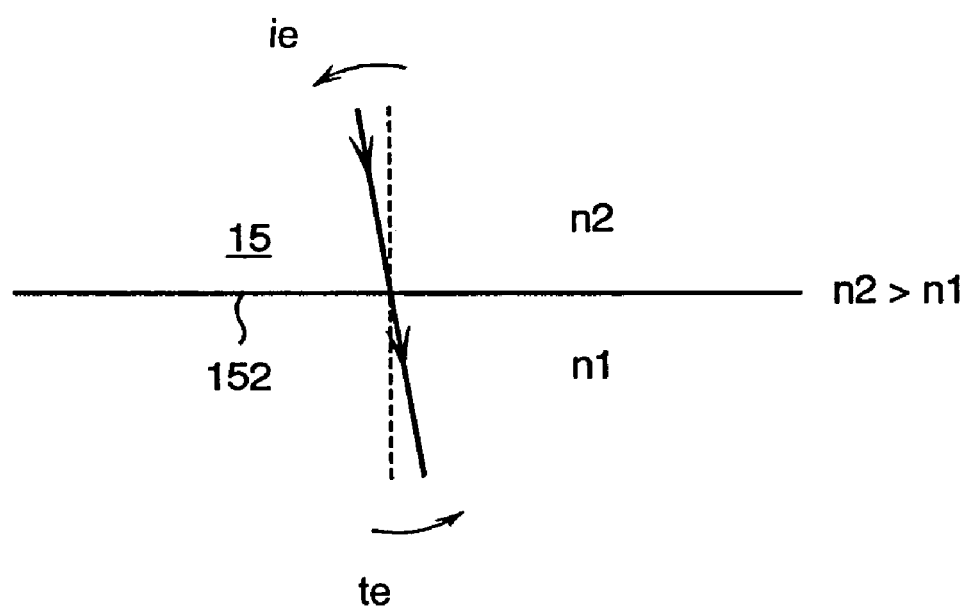

As shown in FIGS. 5(B) and 5(C), the light projecting prism 15 is shaped and positioned with respect to the light emitting element 13 (not shown) so that a light ray incident upon the light incident surface 151 of the light projecting prism 15 at an incident angle i close to but less than 90° is refracted at a refraction angle t that is smaller than the incident angle i and comes out from the light projecting prism 15 without being refracted at the light exit surface 152. As shown in FIG. 6(A), a unit change in the refraction angle t is smaller than a unit change in the incident angle i and this becomes smaller as the incident angle i approximates 90°. Therefore, even if the incident angle i of a light ray incident upon the light incident surface 151 of the light projecting prism 15 varies, the refraction angle t is close to being constant. On the other hand, as shown in FIG. 6(B), when a light ray impinges the light exit surface 152 of the light projecting prism 15 at an impingement angle ie, the outgoing light ray is refracted at an refraction angle te greater than the angle ie. A unit change in the refraction angle te is slightly greater than a unit change in the impingement angle ie. However, a change in refraction angle (outgoing angle) te is up to n2/n1 of a change in the incident angle i.

Consequently, as shown in FIG. 5(A), the degree of parallelism of the outgoing light rays from the light projecting prism 15 is enhanced by making the light rays enter the light projecting prism 15 at an incident angle close to 90° even when the light rays diverge at a certain angle. This arrangement makes it possible that a beam of collimated light rays can be carried a long way while maintaining a certain beam width. Light rays are allowed to enter the light projecting prism 15 at any incident angle smaller than 90° with the consequence that a beam width of the light rays is expanded. Further, these incident angles and outgoing angles may be regulated as appropriate according to the dimensions required intensity of light, a size of the light emitting element 13 and a required beam width of light rays.

As described above, according to the optical sensor, the light projection unit 10 with the light projecting prism 15 projects a wide beam of light rays that is strong in intensity and uniform in intensity distribution toward the field of detection. In consequence, the optical sensor detects accurate information on a subject such as the presence or absence of the subject in the field of detection and measurements and a shape of the subject. As the use of the light projecting prism 15 results in improvement of the degree of parallelism of the light rays, even in the case where the collimator lens 14 is less well contributory to collimating the light rays emanating from the light emitting element 13, the light projecting prism 15 functions and operates to enhance the degree of parallelism of the light rays passing therethrough. This leads to alleviation of the need for precise alignment of an optical system of the optical sensor. Furthermore, as the light projecting prism 15 provides outgoing light rays substantially collimated even when light rays enter the light projecting prism 15 a varied incident angle, it is easy for the light projecting prism 15 to provide collimated light rays having a varied beam width by varying an incident angle of the light rays incident upon the light projecting prism 15.

Generally, in order to attain an enhanced degree of parallelism of the light rays, it is required to use an aspherical lens or a compound lens system. On the other hand, an inexpensive plastic lens is apt to cause deformation due to a change in temperature, and hence to change its refraction index due to the deformation. In consequence, in the case where a plastic lens is used to collimate light rays, parallelism of the light rays is significantly deteriorated due to a change in temperature. Nevertheless, according to the optical sensor of the present invention, since the light projecting prism 15 enhances the degree of parallelism of the light rays collimated by the collimator lens 14, the optical sensor provides the outgoing light rays with a high degree of parallelism even though a plastic lens is employed for the collimator lens 14.

In addition, generally, in order to attain a wide beam of collimated light rays using a collimator lens only, it is essential to use a collimator lens having a large aperture that is comparatively expensive. However, according to the optical sensor of the present invention, since the light projecting prism 15 enhances the degree of parallelism of the outgoing light rays, it is possible to employ a collimator lens having a small aperture that is inexpensive. This arrangement reduces the cost of the optical system of the optical sensor.

Each of the light projecting prism 15 and the light receiving prism 25 are easily manufactured at a low cost because of their simple shapes. In consequence, the optical sensor can be manufactured at a low cost.

The layout of the parts in the generally square housing 11 of the light projection unit 10 is such that the right angle triangular prism 15 and the right angle triangular circuit board 16 are disposed with their hypotenuses opposed to face each other. This layout leads to efficient utilization of the interior space of the square housing 11 with the consequence that the light projection unit 10 can be smaller. Similarly, the layout of parts in the generally square housing 21 of the light detection unit 20 is such that the right angle triangular light receiving prism 25 and the right angle triangular circuit board 26 are disposed with their hypotenuses opposed to face each other. This layout leads to efficient utilization of the interior space of the square housing 21 with the consequence that the light detection unit 20 is downsized. In particular, the configuration that the light rays emanating from the light emitting element 13 and the collimated by the collimator lens 14 are reflected by the reflecting mirror 17 so as to enter the light projecting prism 15 allows the light emitting element 13 and collimator lens 14 to be positioned within a space spatially defined by a width of the light exit surface 152 of the light projecting prism 15. This configuration makes it possible to reduce the width of the light projection unit 10.

Figure 7:
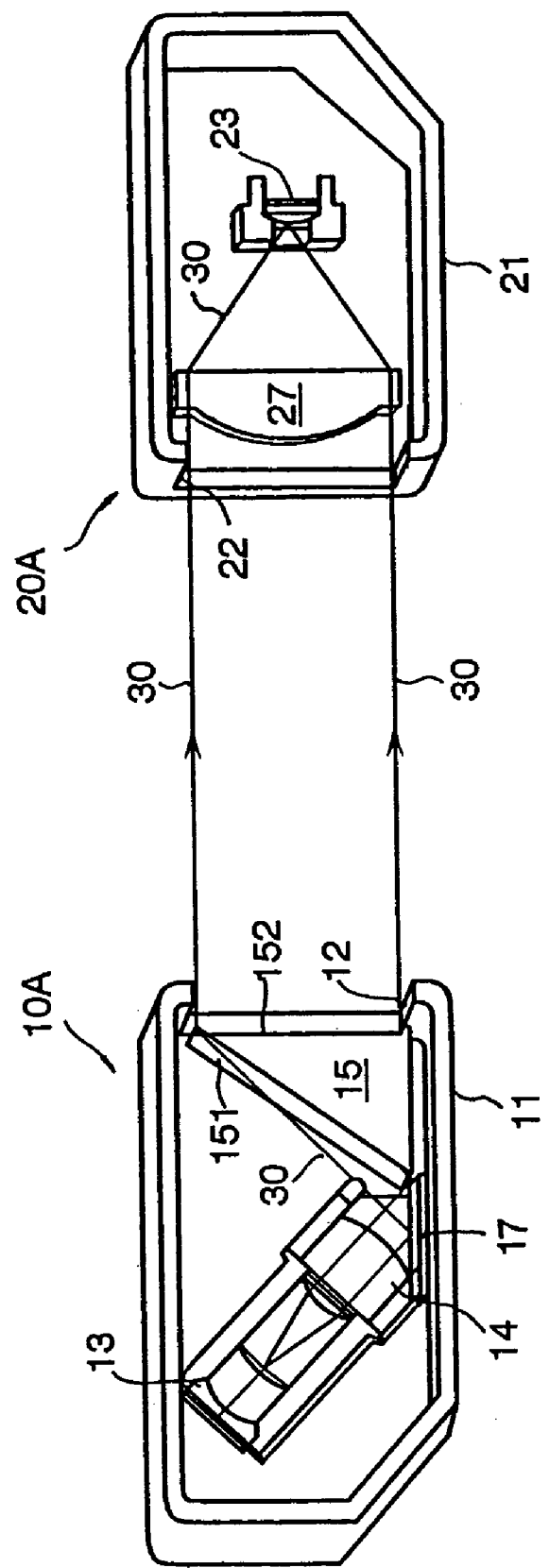
FIG. 7 is a perspective view of an internal structure of an optical sensor according to another embodiment of the present invention.
Figure 8:
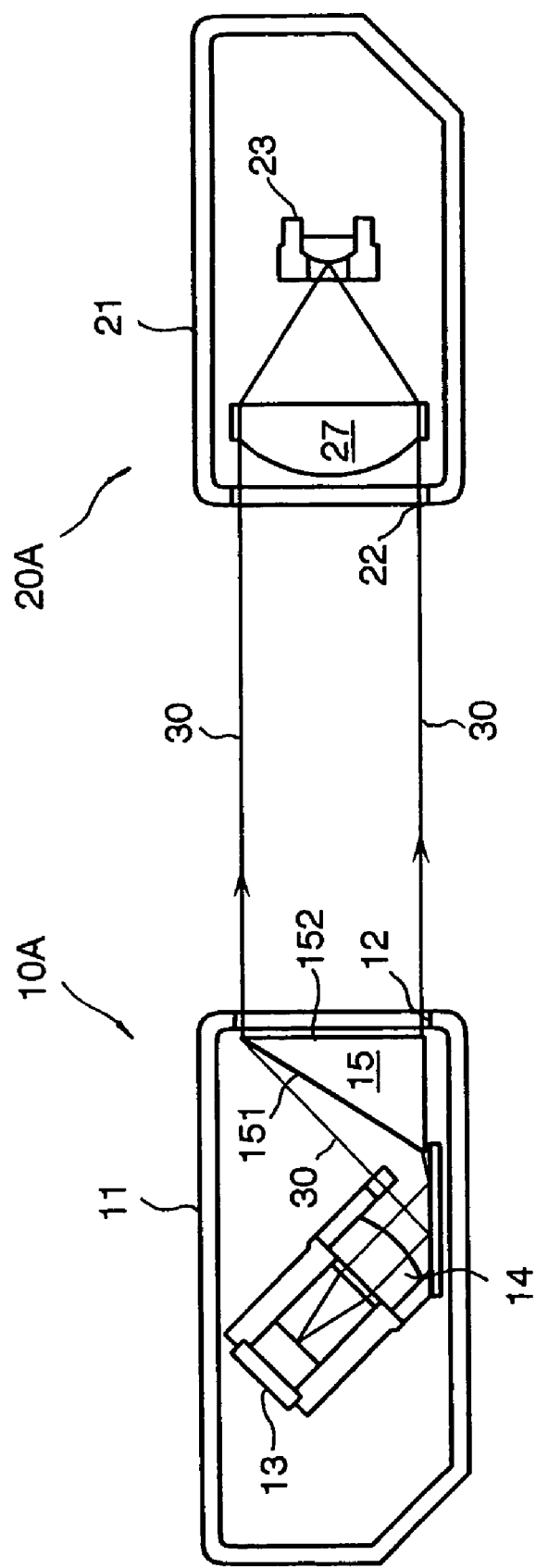
FIG. 8 is a plan view of an internal structure of the optical sensor shown in FIG. 7.

FIGS. 7 and 8 show an optical sensor according to another embodiment of the present invention. The optical sensor comprises a light projection unit 10A and a light detection unit 20A. The light projection unit lOA has a generally rectangular housing 11 with an elongated window 12 formed in one of walls thereof. In the housing 11, there are arranged a light emitting element 13 such as a laser diode, a collimator lens 14, a light projecting prism 15 made of a right angle glass block, a circuit board (not shown but having a right triangle shape) on which a drive circuit for the light emitting element 13 is formed, and a reflecting mirror 17. Specifically, the light projecting prism 15 is positioned in the housing 11 so that one of two side surfaces crossing each other at a right angle that is positioned adjacent to the window 12 forms a light exit surface 152 and the other of the two side surfaces is positioned along one of the walls of the housing 11 that is adjacent to the window 12. The surface of the light projecting prism 15 along the hypotenuse forms a light incident surface 151. The light emitting element 13 is positioned behind the light projecting prism 15 in the housing 11 so as to direct light rays in a direction intersecting obliquely the wall of the housing 11 along which the other side surface of the light projecting prism 15 is positioned. The reflecting mirror 17 is positioned along the wall of the housing 11 along which the other side surface of the light projecting prism 15 is positioned so as to reflect the light rays incident thereupon toward the light incident surface 151 of the light projecting prism 15. The layout of the parts of the light projection unit 10A is such that the right angle triangular prism 15 and the right angle triangular circuit board are disposed with their hypotenuses opposed to face each other. The collimator lens 14 collimates the light rays emanating from the light emitting element 13 and directs the light rays toward the reflecting mirror 17.

The light detection unit 20A has a generally rectangular housing 21 with an elongated window 22 formed in one of walls thereof. In the housing 21, there are arranged in order from the window side a focusing lens 27 and a light receiving element 23 such as a photodiode whose optical axes are aligned in a straight line perpendicular to the window 22. Although not shown in FIGS. 7 and 8, the light detection unit 20A is provided with a circuit board on which a processing circuit operative to process a photo-electric signal from the light receiving element 23 and to provide an output signal is formed.

The light rays 30 emanating from the light emitting element 13 are collimated by the collimator lens 14 and reflected by the reflecting mirror 17 toward the light projecting prism 15. The collimated light rays 30 incident upon the light projecting prism 15 are refracted at the light incident surface 151 and come out from the light receiving prism 25 through the light exit surface 152 into the field of detection. The collimated light rays 30 entering the light detection unit 20A are focused on the light receiving element 23 by the focusing lens 27.

As described above, according to the optical sensor, the light projection unit 10A projects a wide beam of light rays that is strong in intensity and uniform in intensity distribution toward the field of detection. In consequence, the optical sensor detects accurate information on the subject such as the presence or absence of the subject in the field of detection and measurements and a shape of the subject. In particular, the light projecting prism 15 produces a wide beam of light rays distributed evenly in intensity by utilizing and expanding light rays in a certain central zone around an axis of a bundle of light rays with the consequence that the light projecting prism 15 produces a wide beam of light rays. This is realized by disposing the light emitting element 13 and the collimator lens 14 at a long distance. Further, as the use of the light projecting prism 15 results in improvement of parallelism of light rays, the light projection unit 10A projects a beam of light rays having a high degree of parallelism. Further, a required beam width of light rays emanating from the light emitting element 13 is regulated as appropriate by adjusting an incident angle at which the light rays enter the light projecting prism 15. While the light projecting prism 15 is easily manufactured at a low cost because of its simple shape, the use of the light projecting prism 15 that improves the degree of parallelism of the light rays allows an inexpensive lens to be used as the collimator lens 14. This leads to alleviation of precise alignment of the optical system of the optical sensor. In consequence, the optical sensor is manufactured at a low cost.

The layout of the parts in the generally square housing 11 of the light projection unit 10A that the right angle triangular prism 15 and the right angle triangular circuit board are disposed with their hypotenuses opposed to face each other leads to efficient utilization of the interior space of the square housing 11. In particular, the configuration that the light rays emanating from the light emitting element 13 and collimated by the collimator lens 14 are reflected by the reflecting mirror 17 so as to enter the light projecting prism 15 allows the light emitting element 13 and the collimator lens 14 to be positioned within a space spatially defined by a width of the light exit surface 152 of the light projecting prism 15. This configuration makes it possible to reduce the width of the light projection unit 10.

In this embodiment, the light projection unit 10A allows the housing 11 to have a width approximately equal to a beam width of the outgoing light rays. Therefore, it is possible to project an extremely wide beam of light rays by installing a plurality of the light projection units 10 side by side. In this instance, in the case of the optical sensor of the previous embodiment shown in FIGS. 1 and 2 where the light detection unit 20 is provided with the light receiving prism 25, it is essential to make precise positional alignment of the optical system including the light emitting element 23, the focusing lens 24 and the light receiving prism 25. However, in this embodiment, the light detection unit 20A is provided with the focusing lens 27 in place of the light receiving prism 25. This leads to alleviation of precise alignment of an optical system including the focusing lens 27 and the light emitting element 13 of the light detection unit 20A.

Figure 9:
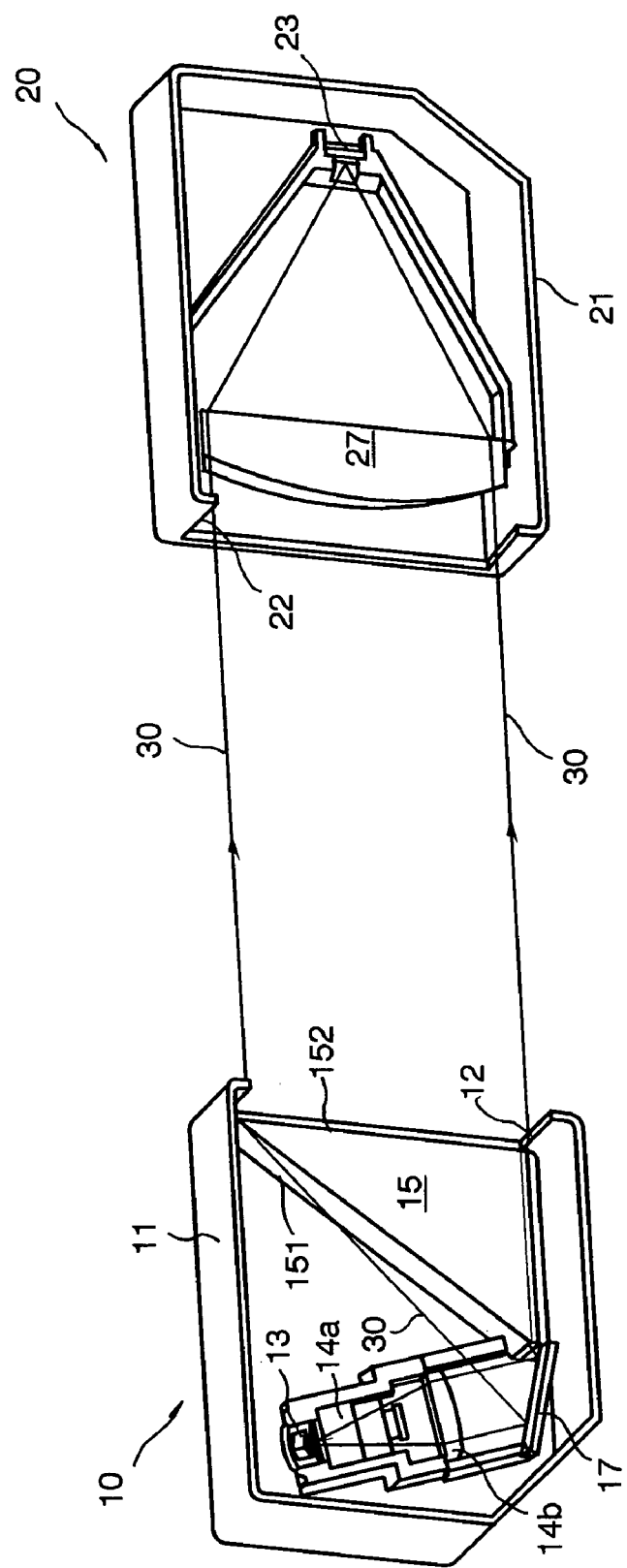
FIG. 9 is a perspective view of an internal structure of an optical sensor according to still another embodiment of the present invention.
Figure 10:
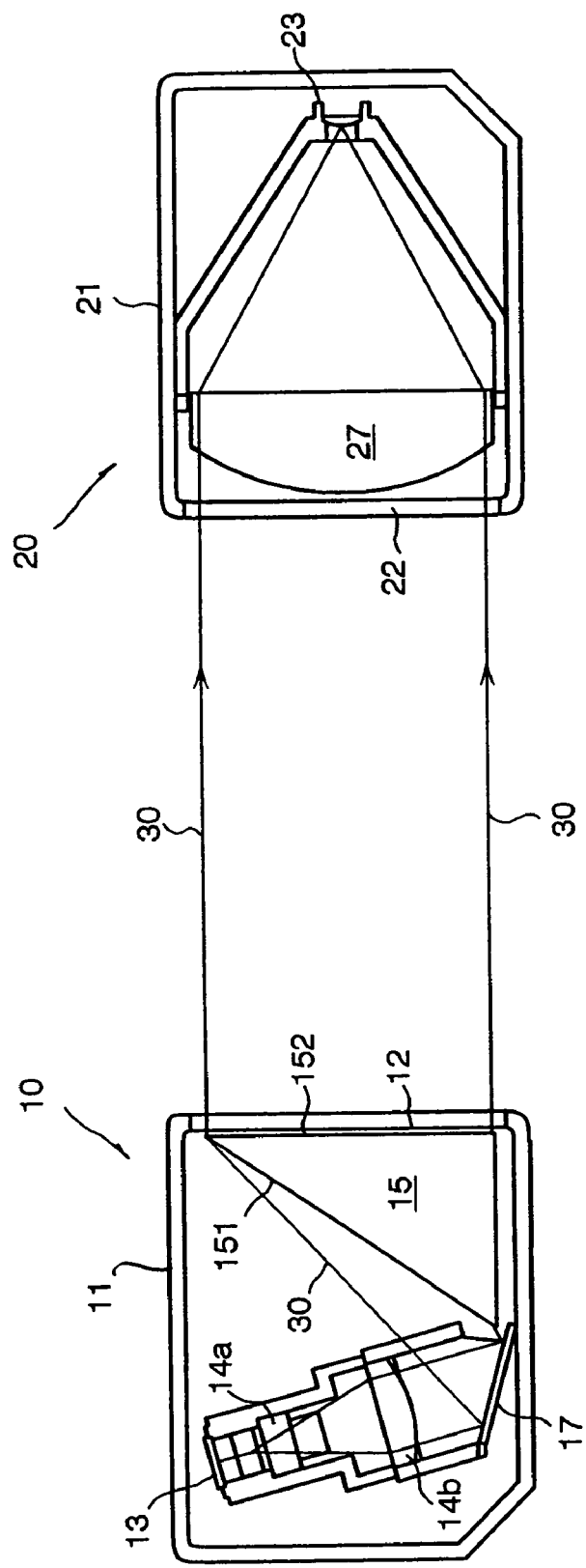
FIG. 10 is a plan view of an internal structure of the optical sensor shown in FIG. 9.

FIGS. 9 and 10 shows an optical sensor according to still another embodiment of the present invention. The optical sensor comprises a light projection unit 10 and a light detection unit 20. The light projection unit 10 has a generally square housing 11 with an elongated window 12 formed in one of the walls thereof. In the housing 11, there are arranged a light emitting element 13 such as a laser diode, cylindrical lenses 14a and 14b forming a compound collimator lens, a light projecting prism 15 made of a right angle glass block, a circuit board (not shown but having a right triangle shape) on which a drive circuit for the light emitting element 13 is formed, and a reflecting mirror 17. Specifically, the light projecting prism 15 is positioned in the housing 11 so that one of the two side surfaces crossing each other at a right angle that is positioned adjacent to the window 12 forms a light exit surface 152 and the other of the two side surfaces is positioned along one of the walls of the housing 11 that is adjacent to the window 12. The surface of the light projecting prism 15 along the hypotenuse forms a light incident surface 151. The light emitting element 13 is positioned behind the light projecting prism 15 in the housing 11 so as to direct light rays in a direction intersecting obliquely the wall of the housing 11 along which the other side surface of the light projecting prism 15 is positioned. The reflecting mirror 17 is positioned along to the wall of the housing 11 along which the other side surface of the light projecting prism 15 is positioned so as to reflect the light rays incident thereupon toward the light incident surface 151 of the light projecting prism 15. The two cylindrical lenses 14a and 14b, that are disposed at a certain distance between the light emitting element 13 and the reflection mirror 17, collimate light rays emanating from the light emitting element 13 and direct the collimated light rays 30 toward the reflecting mirror 17.

The light detection unit 20 has a generally square housing 21 with an elongated window 22 formed in one of the walls thereof. In the housing 21, there are arranged in order from the window side a focusing lens 27 and a light receiving element 23 such as a photodiode whose optical axes are aligned in a straight line perpendicular to the window 22. Although not shown in FIGS. 9 and 10, the light detection unit 20 is provided with a circuit board on which a processing circuit is formed that is operative to process a photo-electric signal from the light receiving element 23 and to provide an output signal.

The light rays 30 emanating from the light emitting element 13 are collimated by the cylindrical lens 14a in a direction of the thickness of the cylindrical lens 14a and then by the cylindrical lens 14b in a direction of the length of the cylindrical lens 14b. The collimated light rays 30 are reflected by the reflecting mirror 17 toward the light projecting prism 15. The collimated light rays 30 incident upon the light projecting prism 15 are refracted at the light incident surface 151 and come out from the light receiving prism 25 through the light exit surface 152 into the field of detection. The collimated light rays 30 entering the light detection unit 20 are focused on the light receiving element 23 by the focusing lens 27.

In this instance, the light projecting prism 15 produces a wide beam of light rays distributed evenly in intensity by utilizing and expanding light rays in a certain central zone around an axis of a bundle of light rays with the consequence that the light projecting prism 15 produces a wide beam of light rays. This is realized by disposing the light emitting element 13 and the cylindrical lens 14b at a long distance apart.

As described above, according to the optical sensor, the light projection unit 10 projects a wide beam of light rays that is strong in intensity and uniform in intensity distribution toward the field of detection. In consequence, the optical sensor detects accurate information on a subject such as the presence or absence of the subject in the field of detection and measurements and a shape of the subject. Further, as the use of the light projecting prism 15 results in improvement in the degree parallelism of the light rays, the light projection unit 10 projects a beam of light rays having a high degree of parallelism. Further, a required beam width of the light rays emanating from the light emitting element 13 is regulated as appropriate by adjusting an incident angle at which the light rays enter the light projecting prism 15. While the light projecting prism 15 is easily manufactured at a low cost because of its simple shape, the use of the light projecting prism 15 that improves the degree of parallelism of the light rays allows inexpensive lenses to be used as the cylindrical lenses 14a and 14b. This leads to alleviate the precise alignment of the optical system of the optical sensor. In consequence, the optical sensor is manufactured at a low cost.

The layout of the parts in the generally square housing 11 of the light projection unit 10 that the right angle triangular prism 15 and the right angle triangular circuit board are disposed with their hypotenuses opposed to face each other leads to efficient utilization of the interior space of the square housing 11. In particular, the configuration that the light rays emanating from the light emitting element 13 and collimated by the cylindrical lenses 14a and 14b are reflected by the reflecting mirror 17 so as to enter the light projecting prism 15 allows the light emitting element 13 and cylindrical lenses 14a and 14b to be positioned within a space spatially defined by a width of the light exit surface 152 of the light projecting prism 15. This configuration makes it possible to reduce the width of the light projection unit 10.

In this embodiment, the light projection unit 10 allows the housing 11 to have a width approximately equal to a beam width of the outgoing light rays. Therefore, it is possible to project an extremely wide beam of light rays by installing a plurality of the light projection units 10 side by side.

Figure 11:
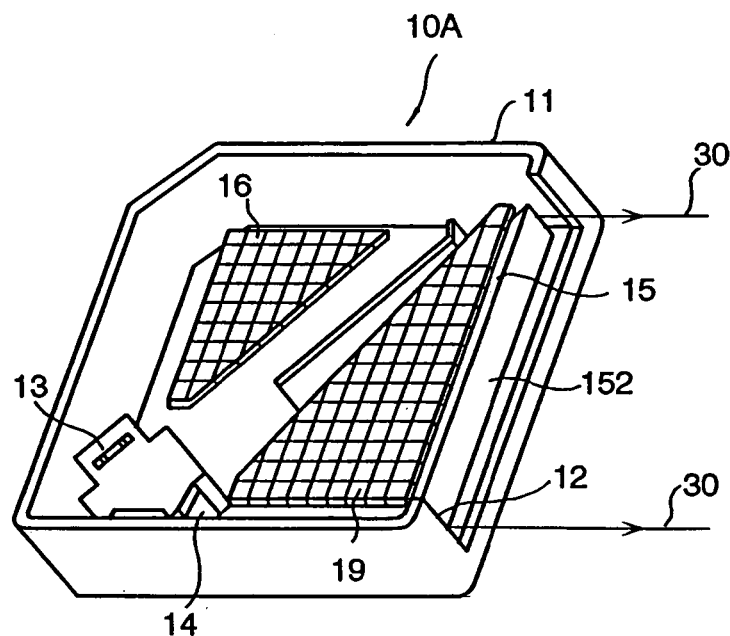
FIG. 11 is a perspective view of an internal structure of a light projection unit of an optical sensor according to still another embodiment of the present invention.
Figure 12:
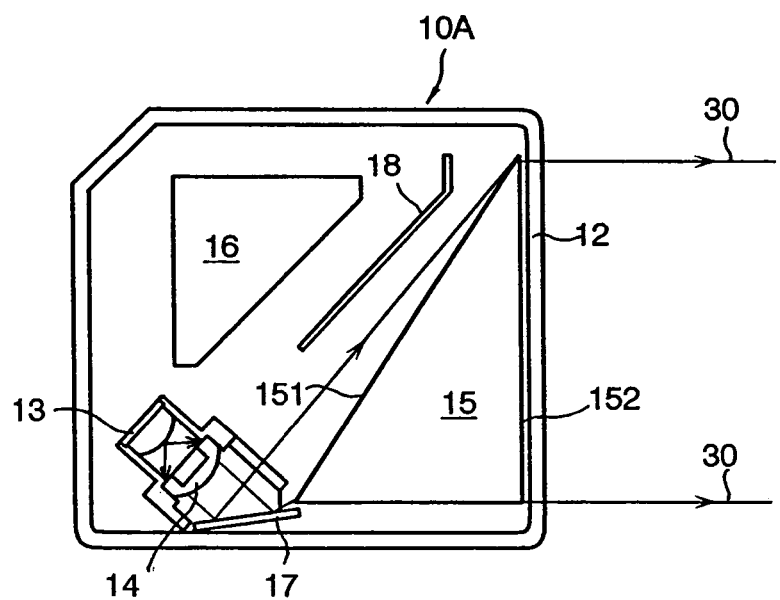
FIG. 12 is a plan view of an internal structure of the light projection unit shown in FIG. 11.

FIGS. 11 and 12 show an optical sensor according to still another embodiment of the present invention which is the same in structure and operation as the optical sensor of each of the previous embodiments except for the light projection unit 10A. The light projection unit 10A has a generally square housing 11 with an elongated window 12 formed in one of walls thereof. In the housing 11 there are arranged a light emitting element 13 such as a laser diode, a collimator lens 14, a light projecting prism 15 made of a right angle glass block, circuit boards 16 and 19, each having a right triangle shape, on which a drive circuit for the light emitting element 13 is formed, a reflecting mirror 17, and a shielding plate 18. Specifically, the light projecting prism 15 is positioned in the housing 11 so that one of the two side surfaces crossing each other at a right angle that is positioned adjacent to the window 12 forms a light exit surface 152 and the other of the two side surfaces is positioned along one of the walls of the housing 11 that is adjacent to the window 12. The surface of the light projecting prism 15 along the hypotenuse forms a light incident surface 151. The light emitting element 13 is positioned close to an intersection between the hypotenuse and the other side of the light projecting prism 15 in the housing 11. The reflecting mirror 17 is positioned along the wall of the housing 11 along which the other side surface of the light projecting prism 15 is positioned. The collimator lens 14 is positioned between the light emitting element 13 and the reflection mirror 17 so as to collimate the light rays emanating from the light emitting element 13 and to direct the collimated light rays toward the reflection mirror 17. The reflecting mirror 17 reflects the collimated light rays incident thereupon obliquely toward the light incident surface 151 of the light projecting prism 15. The right angle triangular prism 15 and one of the right angle triangular circuit boards, namely the circuit board 16, are disposed with their hypotenuses opposed to face each other. The other circuit board 19 is positioned on the light projecting prism 15. The shielding plate 18 is disposed between the hypotenuses of the right angle triangular prism 15 and the right angle triangular circuit board 16 in the housing 11.

The light rays 30 emanating from the light emitting element 13 are collimated by the collimator lens 14 and reflected by the reflecting mirror 17 toward the light projecting prism 15. The collimated light rays 30 incident upon the light projecting prism 15 are refracted at the light incident surface 151 and come out from the light projecting prism 15 through the light exit surface 152 into the field of detection.

According to the optical sensor, the light projection unit 10 projects a wide beam of light rays that is strong in intensity and uniform in intensity distribution toward the field of detection. In consequence, the optical sensor detects accurate information on the subject such as the presence or absence of the subject in the field of detection and measurements and a shape of the subject. Further, as the use of the light projecting prism 15 results in improvement in the degree of parallelism of the light rays, the light projection unit 10 projects a beam of light rays having a high degree of parallelism. Further, a required beam width of the light rays emanating from the light emitting element 13 is regulated as appropriate by adjusting an incident angle at which the light rays enter the light projecting prism 15. While the light projecting prism 15 is easily manufactured at a low cost because of its simple shape, the use of the light projecting prism 15 that improves the degree of parallelism of the light rays allows inexpensive lenses to be used as the collimator lens 14. This leads to alleviate the precise alignment of the optical system of the optical sensor. In consequence, the optical sensor is manufactured at a low cost.

The parts in the generally square housing 11 of the light projection unit 10 are laid out such that one of the right angle triangular circuit boards 16 and 19 is disposed with its hypotenuse opposed to that of the right angle triangular prism 15 and the other is superposed on the right angle triangular prism 15 with their hypotenuses in line with each other. This layout leads to efficient utilization of the interior space of the square housing 11. The configuration that the light rays emanating from the light emitting element 13 and collimated by the collimator lens 14 are reflected by the reflecting mirror 17 so as to enter the light projecting prism 15 allows the light emitting element 13 and the collimator lens 14 to be positioned within a space spatially defined by a width of the light exit surface 152 of the light projecting prism 15. This configuration makes it possible to reduce the width of the light projection unit 10.

In particular in this embodiment, the light projection unit 10 allows the housing 11 to have a width approximately equal to a beam width of the outgoing light rays. Therefore, it is possible to project an extremely wide beam of light rays by installing a plurality of light projection units 10 side by side. In addition, the shielding plate 18 disposed between the light incident surface 151 of the light projecting prism 15 and the circuit board 16 prevents the light rays reflected by the reflection mirror 18 from being further reflected by the circuit board 16 and, in consequence, from turning into stray light rays. When the circuit board 16 is flexible, the shielding plate 18 prevents the circuit board 16 from mechanically interfering with the light projecting prism 15.

Figure 13:
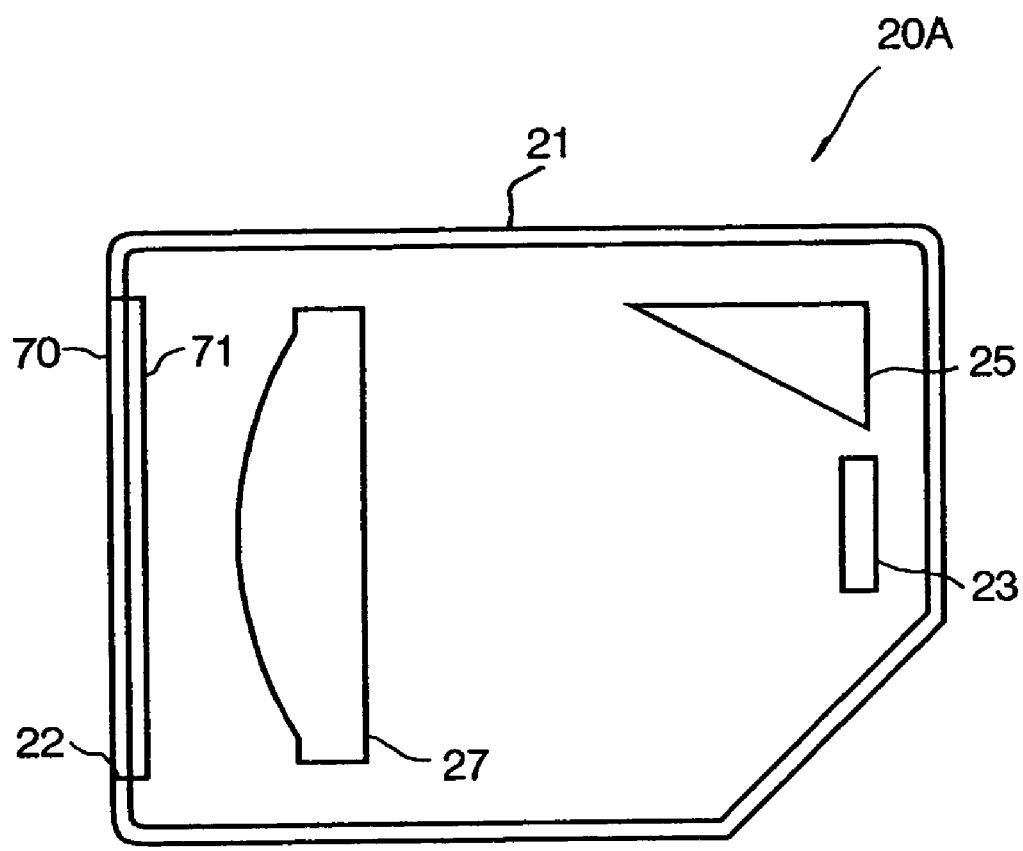
FIG. 13 is a plan view of a variation of the light projection unit.

FIG. 13 shows an optical sensor according to still another embodiment of the present invention which is the same in operation and structure as the optical sensor of each of the previous embodiments except for the light detection unit 20A. The light detection unit 20 has a generally rectangular housing 21 with an elongated window 22 formed in one of the walls thereof. In the housing 21, there are arranged in order from the window side a focusing lens 27, a light receiving element 23 such as a photodiode, whose optical axes are aligned in a straight line perpendicular to the window 22, and a circuit board 25 on which a processing circuit is formed that is operative to process a photo-electric signal from the light receiving element 23 and to provide an output signal. The housing 21 is further provided with a transparent window cover 70 with a light opaque plate 71 adhered or otherwise fixedly attached thereto that is installed in the window 22. The light opaque plate 71 has an elongated opening 72 formed therein.

Figure 14A:
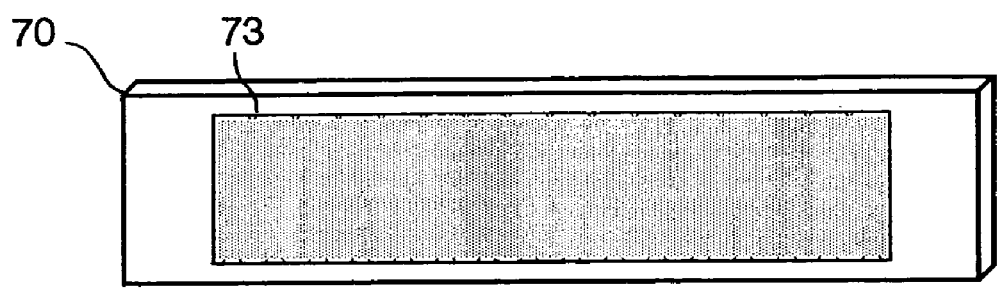
FIG. 14(A) is a perspective view of a window cover.

Referring to FIG. 14(A) showing the transparent window cover 70 in detail, the transparent window cover 70 is made of a plastic plate or a plastic film and is provided with a halftone dot filter 73 which will be described in detail later. The halftone dot filter 73 is printed on either surface of the window cover 70 with the consequence that the optical sensor is offered for a reduced price. It is preferred to print the halftone dot filter 73 onto the inner surface of the window cover 70 in order to prevent the halftone dot filter 73 from being touched by an operator and/or detached from the window cover 70.

Figure 14B:
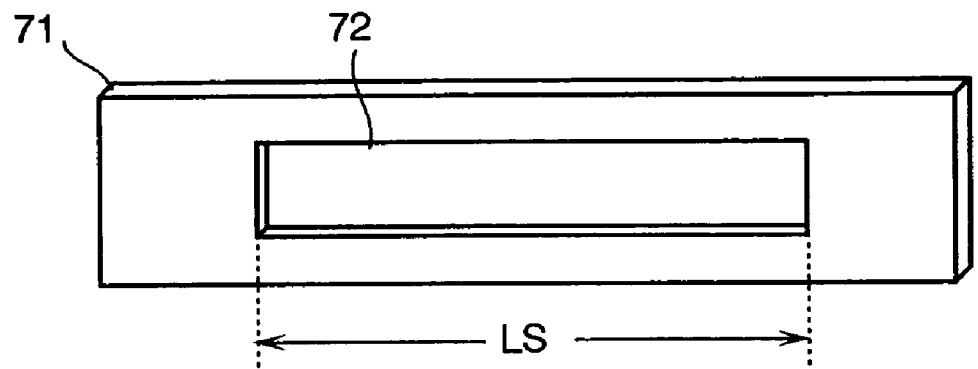
FIG. 14(B) is a perspective view of a slit member.

Referring to FIG. 14(B), the elongated opening 72 formed in the light opaque plate 71 has a length LS that is greater than the beam width of the light rays from the light projection unit 10. The light opaque plate 71 may be made of a metal plate or a plastic plate and preferably of a stainless steel plate. Otherwise, the elongated opening 72 may be formed by printing a rectangular frame on the transparent window cover 70. The light opaque member 71 is not restricted in color; however, it is preferred to use a bright color such as white on the opaque member 71 in light of clear visibility of the spots. Although the opaque member 71 may be put on either side of the window cover 70, it is preferred for the opaque member 71 to be on the backside of the window cover 70 to achieve a stain proof purpose.

Figure 15:
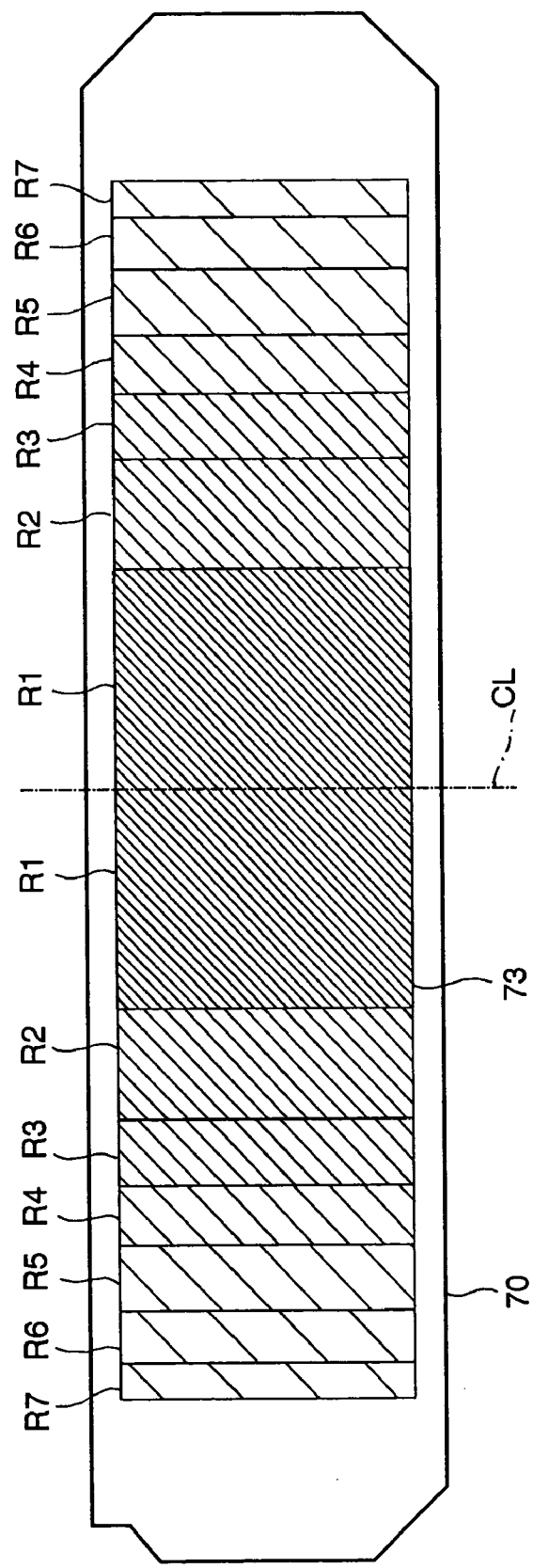
FIG. 15 is a plan view of the window cover.
Figure 16:
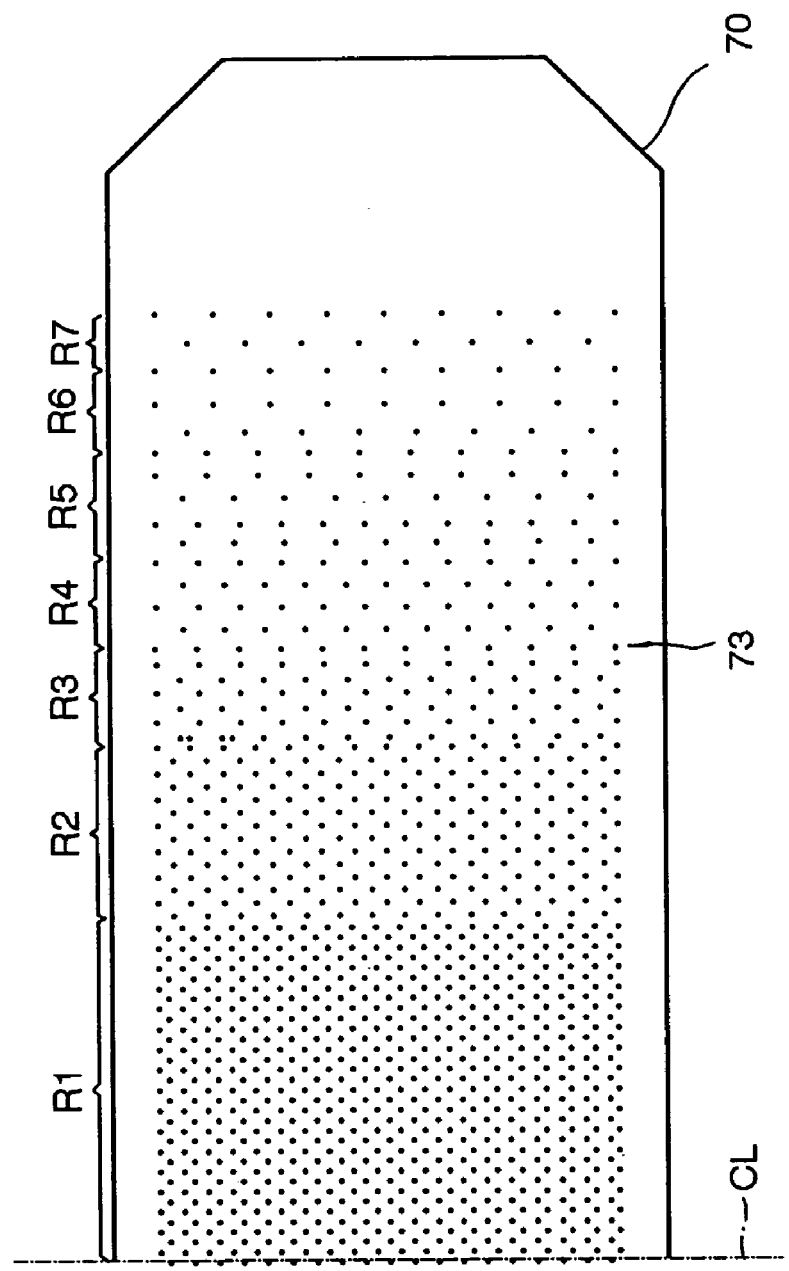
FIG. 16 is an enlarged plan view of half of a halftone dot filter formed on the window cover.
Figure 17:
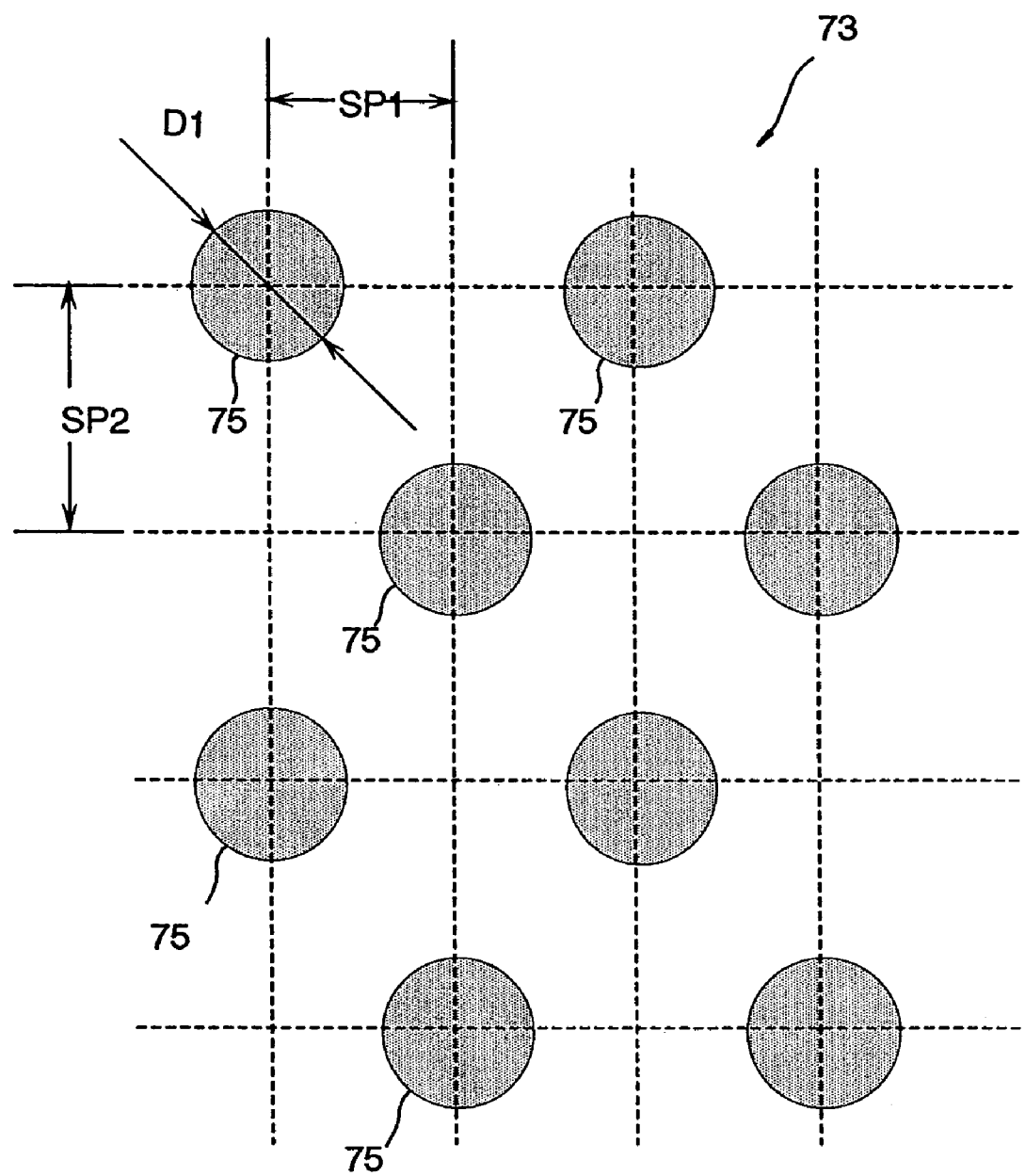
FIG. 17 is an enlarged partial plan view of a halftone dot filter.

Referring to FIGS. 15 to 17 showing the halftone dot filter 73 that is printed thereon, the halftone dot filter 73 comprises right and left halves that are symmetrical in filter patterns to each other with respect to the center line CL. Each half filter pattern comprises seven filter regions R1 to R7, each being formed by a number of circular dots which are identical in shape, size and density and arranged at regular distances. As shown more specifically in FIG. 16, the filter regions R1 to R7 are different in inter-dot distance, in other words in dot density, from one another in steps and are arranged in order of dot density. Specifically, the filter region R1 closest to the center line CL has the highest dot density, and the filter region R7 farthest from the center line CL has the lowest dot density.

As shown in FIG. 17 showing a dot arrangement of the halftone dot filter 73, the halftone dots 75 have a diameter D1 (mm) and are spaced apart from one another at regular inter-dot distances of SP1 (mm) in the horizontal direction (in the lengthwise direction of the window cover 70) and regular inter-dot distances of SP2 (mm) in the vertical direction (in the transverse direction of the window cover 70). Measurements of dot arrangements of the filter regions R1 to R7 are shown below by way of example.

| Region | Dot Diameter (mm) | Horizontal Inter-dot Distance (mm) | Vertical Inter-dot Distance (mm) |
| --- | --- | --- | --- |
| R1 | 0.10 | 0.10 | 0.12 |
| R2 | 0.10 | 0.12 | 0.12 |
| R3 | 0.10 | 0.12 | 0.14 |
| R4 | 0.10 | 0.14 | 0.14 |
| R5 | 0.10 | 0.16 | 0.16 |
| R6 | 0.10 | 0.18 | 0.18 |
| R7 | 0.10 | 0.20 | 0.20 |

As shown above, both the horizontal and vertical inter-dot distances SP1 and SP2 are increased in steps in order from the filter region R1 to the filter region R7, in other words, the dot density is decreased in steps from the filter region R1 to the filter region R7. The light rays going in the window cover 70 with the halftone dot filter 73 formed thereon are partly diffusively reflected by the halftone dots 75 of the halftone dot filter 73 and partly pass through the remaining part of the halftone dot filter 73 except for the halftone dots 75. Accordingly, the intensity of the light rays passing through the halftone dot filter 73 increasingly change in steps from a central portion including the filter regions R1 to the opposite extreme portions, i.e. the filter regions R7. Since the intensity of the light rays emanating from the light emitting element 13 and projected from the light projection unit 10 decreasingly change from the axis of the bundle of light rays, the light rays having passed through the halftone dot filter 73 are approximately even in intensity distribution over the entire area of the halftone dot filter 73.

Although the halftone dot 75 is not restricted to a specific color, it is preferred to give the dots a bright color appearance so that light rays impinging on the halftone dot filter 73 are visible in the form of light spots. For example, when the dots are colored white, light rays impinging on the halftone dot filter 73 are highly visible in the form of light spots.

In this instance, the halftone dot filter 73 may be linearly changed in dot density from the center to the extreme ends. The inter-dot distances may be differed among the filter regions R1 to R7 in either one of the horizontal and vertical directions only. Further, the filter regions R1 to R7 may be differed in dot density from one another by differing the sizes of the dots.

Figure 18:
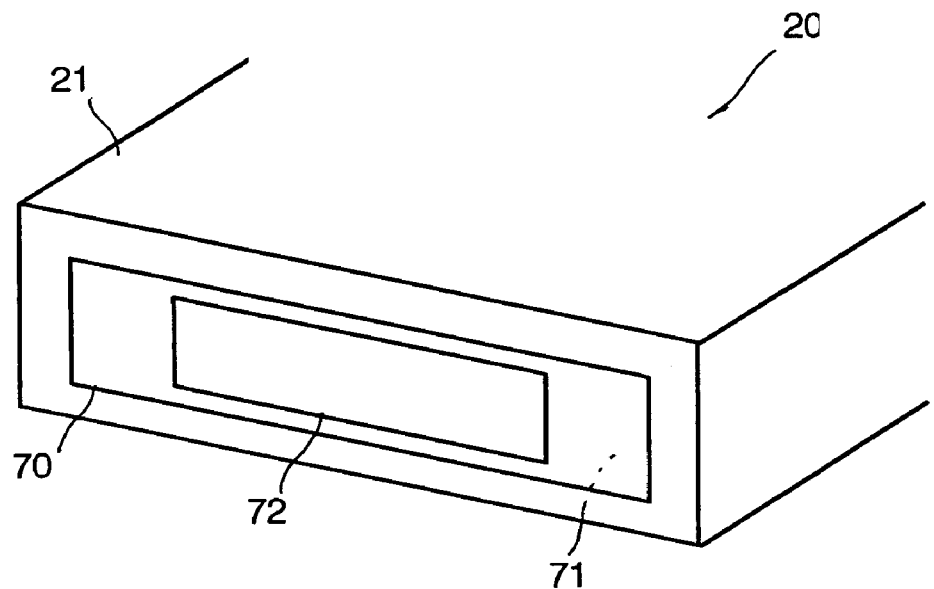
FIG. 18 is a perspective front view of a light receiving unit.
Figure 19:
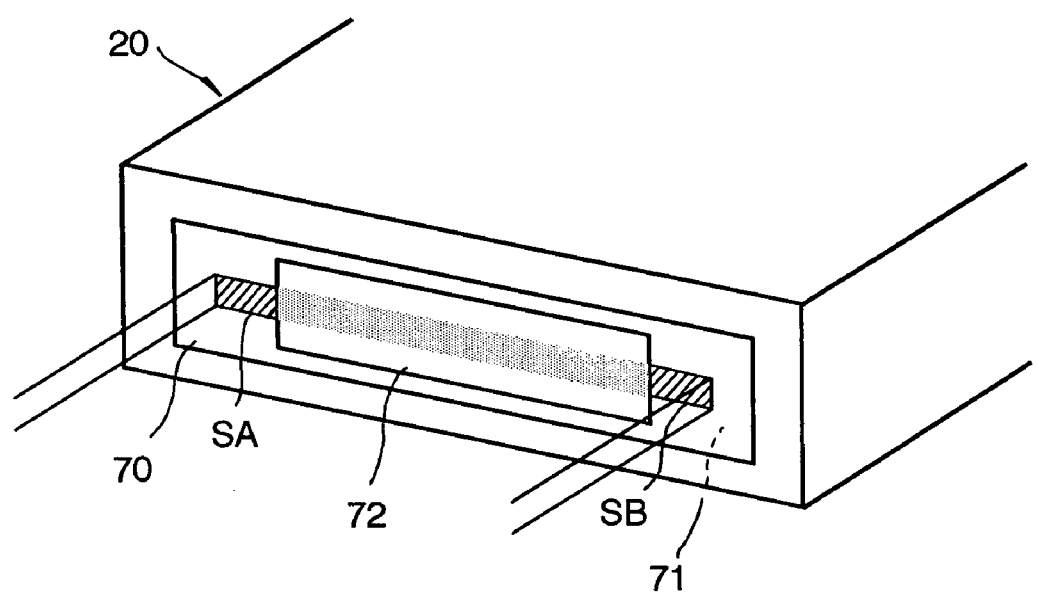
FIG. 19 is a perspective view showing light spots formed on a slit member by a parallel beam of light rays from the field of detection.

FIGS. 18 and 19 show the light detection unit 20 of the optical sensor shown in FIGS. 9 to 17. As shown in FIG. 18, the elongated opening 72 formed in the light opaque plate 71 is seen through the transparent window cover 70. Further, as shown in FIG. 19, the collimated light rays impinging on the transparent window cover 70 form light spots SA and SB at opposite sides of the elongated opening 72 of the light opaque plate 71 in the horizontal or lengthwise direction. These light spots SA and SB are utilized for easily and accurately performing optical adjustment between the light projection unit 10 and the light detection unit 20 in the horizontal and vertical directions. In addition, these light spots SA and SB easily ensure that the light projection unit 10 and the light detection unit 20 are kept optically aligned while the optical sensor is in use. More specifically, when the optical sensor is optically adjusted or when the light projection unit 10 and the light detection unit 20 are out of optical alignment, optical alignment is achieved for the light projection unit 10 and the light detection unit 20 in horizontal direction by forming the light spots SA and SB of equal length at the opposite sides of the elongated opening 72 of the light opaque plate 71 in the horizontal direction. Further, these light spots SA and SB are used for easily adjusting a center line of the light rays to the center line CL of the halftone dot filter 73 by forming the light spots SA and SB of equal length at the opposite sides of the elongated opening 72 of the light opaque plate 71 in horizontal direction with the consequence that that the intensity distribution of the light rays is easily made uniform over the area of the halftone dot filter 73 defined by the elongated opening 72 of the light opaque plate 71.

In the case where a subject enters the field of detection, that is defined by the elongated opening 72 of the light opaque plate 71, from one side in the horizontal direction, the light spot SA or SB is blocked by the subject in a position immediately before the field of detection and casts a shadow of the subject on the light opaque plate 71. Therefore, the light spots SA and SB are also utilized for reading the timing of an arrival of the subject to the field of detection.

The halftone dot filter 73 may be located in the light projection unit 10. In this instance, outgoing light rays from the light projection unit 10 interfere with one another. For this reason, it is preferred for the halftone dot filter 73 to be installed in the light detection unit 20 like the instant embodiment. The outgoing light rays from the light projection unit 10 form a collimated beam as described above, the intensity distribution of the outgoing light rays from the light projection unit 10 is invariable irrespective of variations in distance between the light projection unit 10 and the light detection unit 20. Therefore, an even intensity distribution of the light rays passed through the halftone dot filter 73 is realized irrespective of the variations in the distance between the light projection unit 10 and the light detection unit 20 by determining the dot densities of the halftone dot filter 73 according to the intensity distribution of the outgoing light rays from the light projection unit 10.

Figure 2:
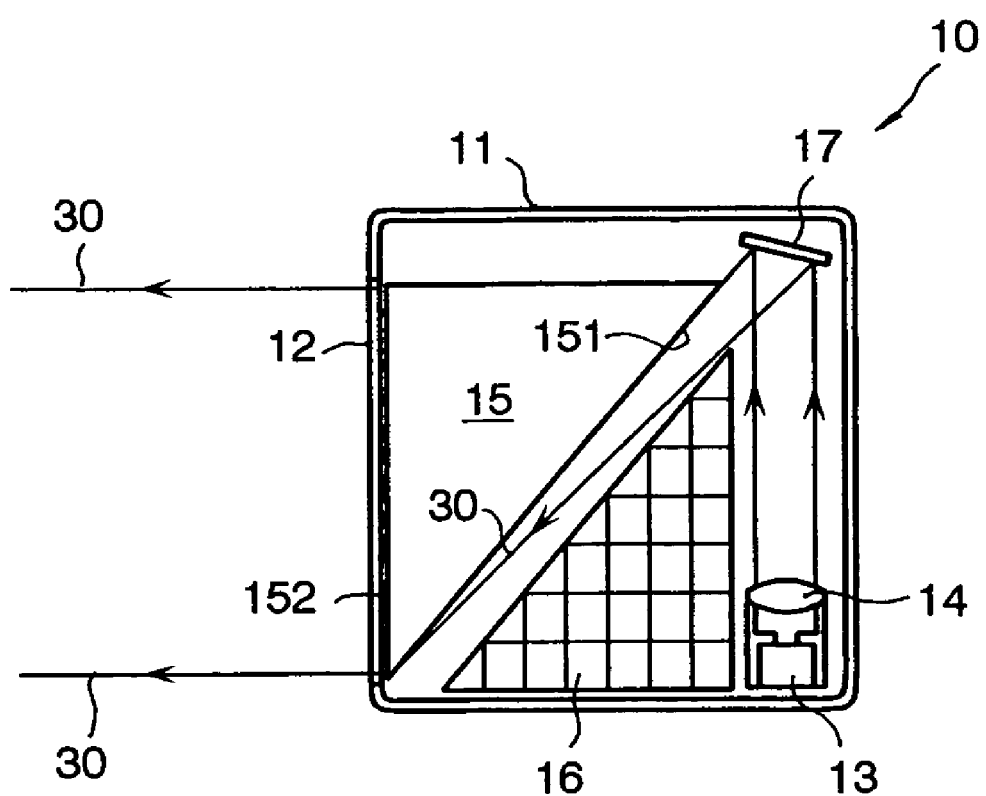
FIG. 2 is a schematic plan view of the internal structure of a light projection unit of the optical sensor shown in FIG. 1.
Figure 20:
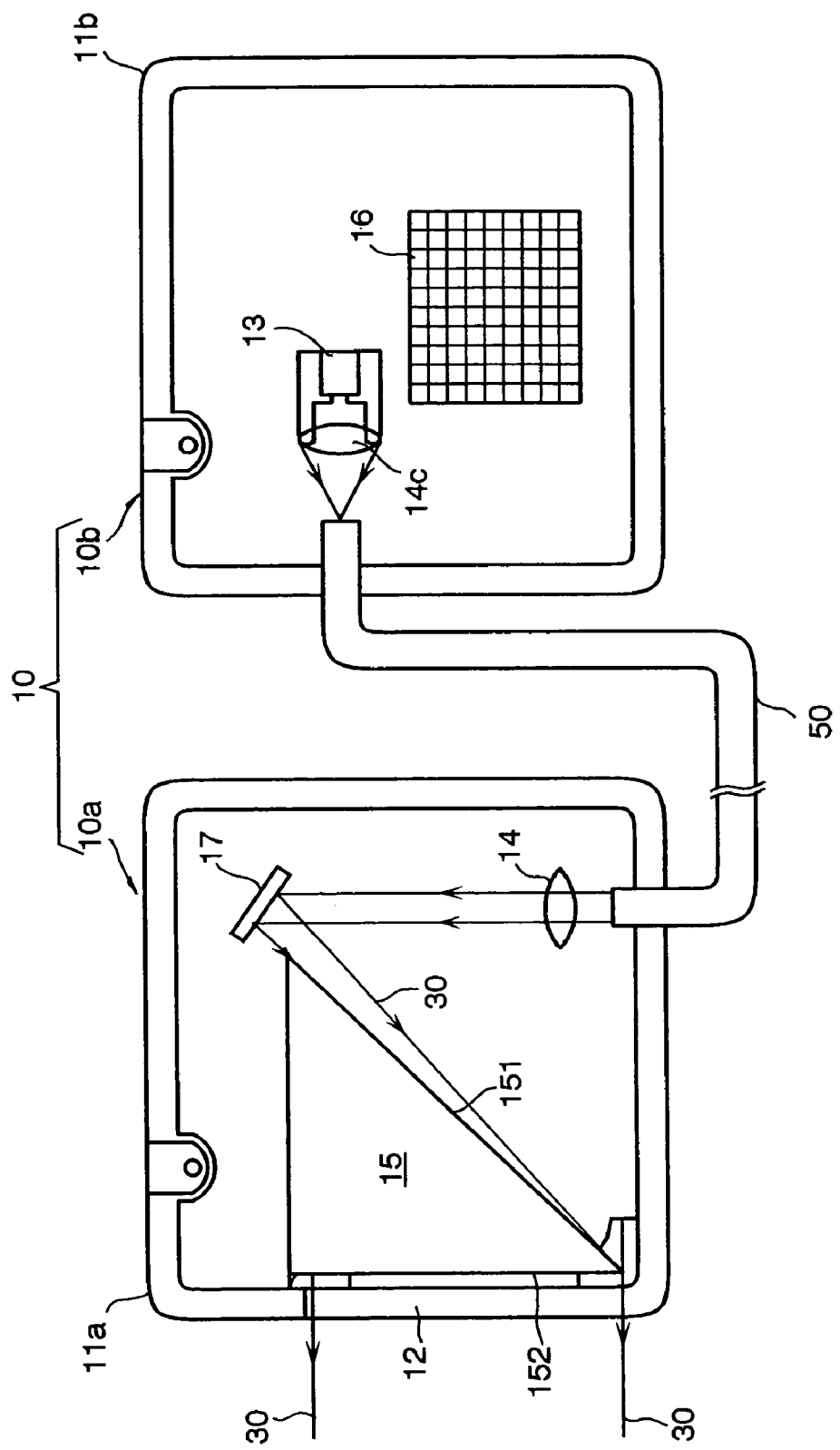
FIG. 20 is a plan view of an internal structure of an optical sensor according to a further embodiment of the present invention.
Figure 21:
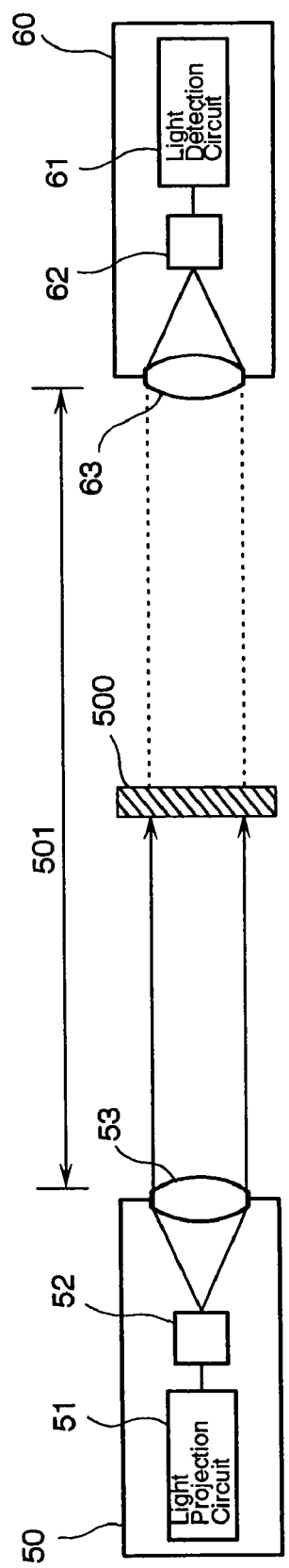
FIG. 21 is an illustration showing the basic structure of a conventional transmission optical sensor.
Figure 22:
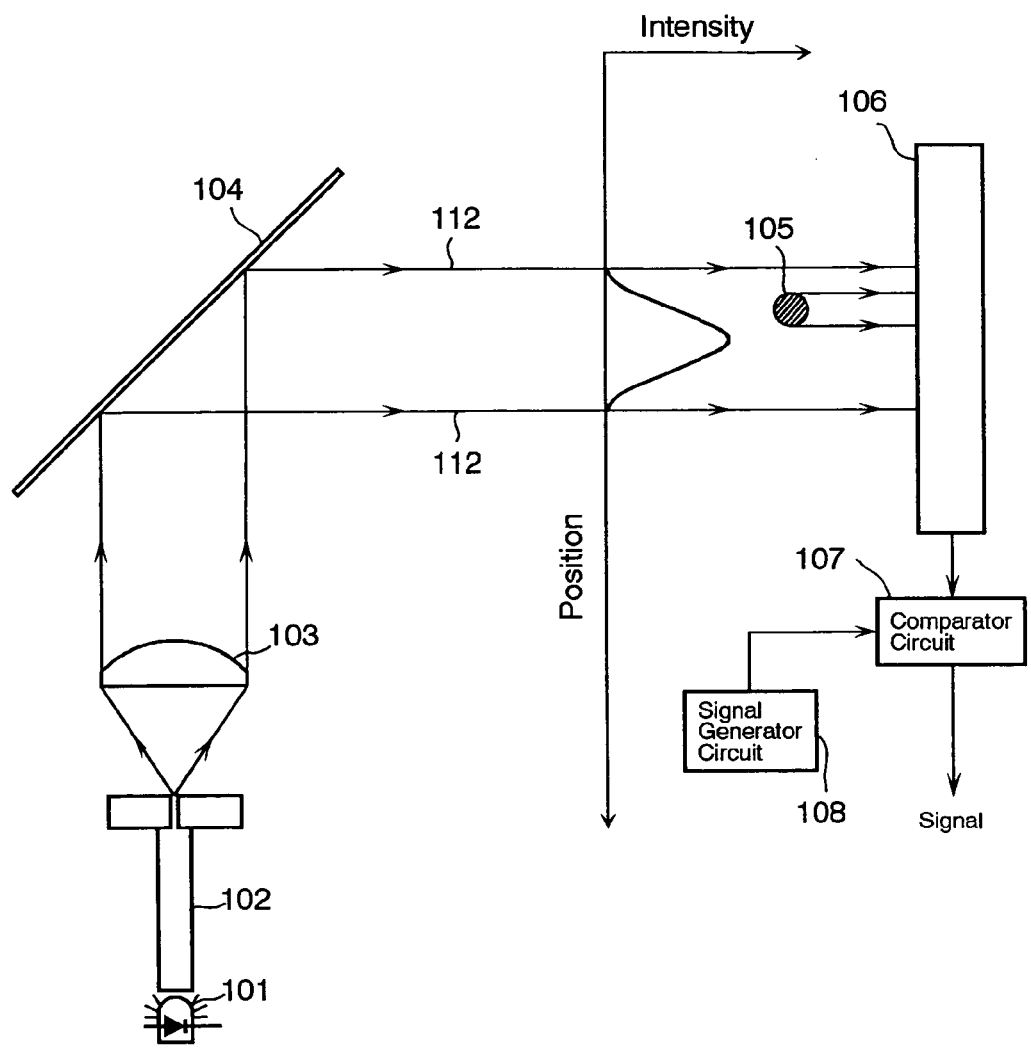
FIG. 22 is a view schematically showing one of the conventional optical sensors by way of example.
Figure 23:
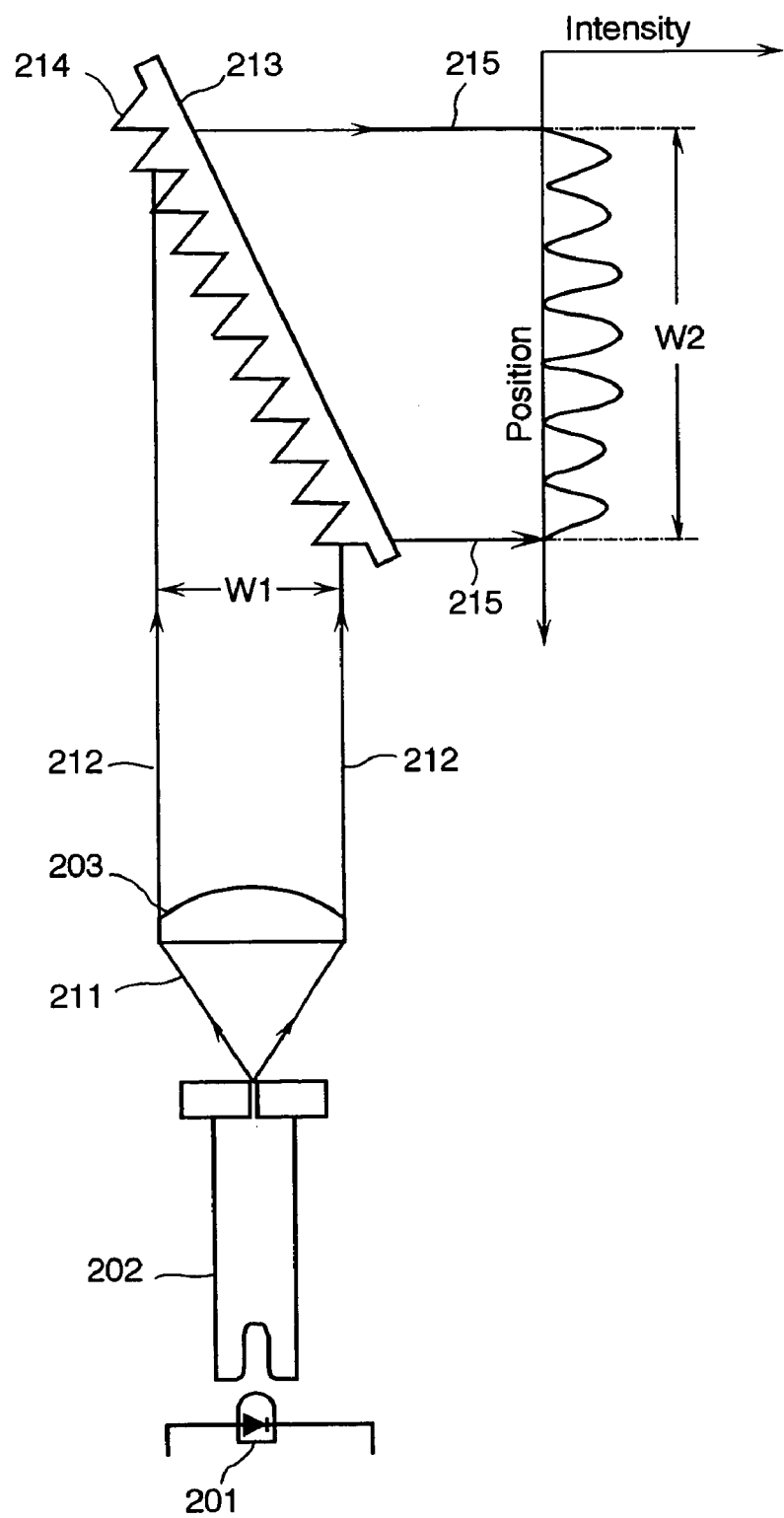
FIG. 23 is a view schematically showing another conventional optical sensor by way of example.

FIG. 20 shows an internal structure of an optical sensor according to a further embodiment of the present invention which is the same in structure and operation as the optical sensor of the previous embodiment shown in FIGS. 1 and 2 except for a separate type of light projection unit 10. As shown, the main unit 10b has a generally square housing 11b. In the housing 11, there are arranged a light source, namely a light emitting element 13 such as a laser diode, a condenser lens 14c, and a circuit board 16 having a right triangle shape on which a drive circuit for the light emitting element 13 is formed. Light rays emanating from the light emitting element 13 are focused on one end of the light guide fiber bundle 50 by the condenser lens 14c. The light guide fiber bundle 50 guides the incoming light rays from one end to another end thereof.

The light projection unit 10 comprises a light projection head unit 10a and a main unit 10b which are separately provided and optically connected by a light guide fiber bundle 50. The light projection head unit 10a has a generally square housing 11a with an elongated window 12 formed in one of walls thereof. In the housing 11, there are arranged a collimator lens 14, a light projecting prism 15 made of a right angle glass block, and a reflecting mirror 17. Specifically, the light projecting prism 15 is positioned in the housing 11 so that one of the two side surfaces crossing each other at a right angle forms a light exit surface 152 and is adjacent to the window 12. The hypotenuse surface of the light projecting prism 15 forms a light incident surface 151 and lies almost along a diagonal line of the housing 11. The collimator lens 14 is positioned adjacent to the other end of the light guide fiber bundle 50 so as to collimate the outgoing light rays 30 from the light guide fiber bundle 50 and to direct the light rays 30 toward the reflecting mirror 17. The reflecting mirror 17 is positioned so as to reflect the light rays 30 incident thereupon at an angle of 45° and to direct them to the light projecting prism 15. The collimated light rays 30 incident upon the light projecting prism 15 are refracted at the hypotenuse surface, i.e. the light incident surface 151 and come out of the light projecting prism 15 through the light exit surface 152.

According to the optical sensor, the separate type of light projection unit 10 with the light projecting prism 15 projects a wide beam of light rays that is strong in intensity and uniform in intensity distribution toward the field of detection. In consequence, the optical sensor detects accurate information on the subject such as presence or absence of the subject in the field of detection and measurements and a shape of the subject. The use of the light projecting prism 15 results in improvement in the degree of parallelism of the light rays. The beam width of the outgoing light rays from the light projection unit 10 is regulated as appropriate by adjusting an incident angle at which the light rays enter the light projecting prism 15. Further, the light projecting prism 15 is easily manufactured at a low cost because of its simple shape. The use of the light projecting prism 15 that improves the degree of parallelism of the light rays allows an inexpensive lens to be used as the collimator lens 14. This leads to alleviation of the precise alignment of the optical system of the optical sensor with the consequence that the optical sensor is manufactured at a low cost.

In the previous embodiments, the light emitting element 13 is not restricted to a laser diode and may be any type of light emitting diode (LED) or the like. Although the light detection unit 20 is provided with the light receiving prism 25, that is identical in structure and operation with the light projecting prism 15 of the light projection unit 10, or the focusing lens 27, it is possible to eliminate the light receiving prism 25 or the focusing lens 27 by employing a charge coupled device (CCD) for the light receiving element 23 in place of a photodiode. Further, although the optical sensors described as preferred embodiments are of a transmission type, the present invention is applicable to reflection types of optical sensors which detect information on a subject based on the light rays reflected by the subject. The present invention is also applicable to optical sensors for optical scanners, optical shape measuring equipment, laser pointers and the like.

Although the present invention has been described with reference to preferred embodiments thereof, it will be appreciated that variants and other embodiments can be effected by person of ordinary skill in the art without departing from the scope of the invention.

What is claimed is:

1. An optical sensor for projecting light rays into a field of detection for detecting information of a subject in the field of detection based on light rays passing through the field of detection, said optical sensor comprising:

a housing having an elongated window;

a light projecting prism having a first surface and a second surface disposed at a predetermined angle less than 90° to said first surface and disposed adjacent to said elongated window of said housing;

light source means for providing light rays, said light source means having at least a portion thereof disposed in said housing;

a collimator lens collimating the light rays emanating from said light source means so as to provide collimated light rays therefrom;

wherein said light projecting prism for refracting the collimated light rays incident on said first surface at an angle less than 90° and for expanding a width of the collimated light rays along a longitudinal direction of said elongated window to project the collimated light rays from said second surface into the field of detection through said elongated window of said housing;

wherein said housing is a first housing, said optical sensor further comprising a second housing having a condenser lens therein for condensing the light rays projected into and passed through the field of detection and a light receiving element in said housing for receiving the light rays condensed and focused thereon by said condenser lens to convert intensity of the light rays incident thereupon into an electric signal.

2. The optical sensor as defined in claim 1, wherein said light projecting prism has a right triangle shape whose hypotenuse forms the first surface.

3. The optical sensor as defined in claim 2, further comprising a reflection means for reflecting the collimated light rays from said light source means toward to the first surface of said light projecting prism.

4. The optical sensor as defined in claim 2, further comprising a substantially triangularly shaped circuit board with a drive circuit for said light source means formed thereon, the triangularly shaped circuit board including a hypotenuse;

wherein said circuit board and said light projecting prism are disposed so that their respective hypotenuses face each other.

5. The optical sensor as defined in claim 4, wherein said light source means is positioned within a space in said housing spatially defined by a width of the second surface of said light projecting prism.

6. The optical sensor as defined in claim 5, further comprising light shielding means for shielding light rays from said circuit board, said light shielding means being disposed between said light source means and the first surface of said light projecting prism.

7. An optical sensor for projecting light rays into a field of detection for detecting information of a subject in the field of detection based on light rays passing through the field of detection, said optical sensor comprising:

a housing having an elongated window;

a light projecting prism having a first surface and a second surface disposed at a predetermined angle less than 90° to said first surface and disposed adjacent to said elongated window of said housing;

light source means for providing light rays, said light source means having at least a portion thereof disposed in said housing;

a collimator lens collimating the light rays emanating from said light source means so as to provide collimated light rays therefrom;

wherein said light projecting prism for refracting the collimated light rays incident on said first surface at an angle less than 90° and for expanding a width of the collimated light rays along a longitudinal direction of said elongated window to project the collimated light rays from said second surface into the field of detection through said elongated window of said housing;

wherein the collimated light rays exit from said light projecting prism perpendicular to said second surface of said light projecting prism;

wherein said housing is a first housing, said optical sensor further comprising a second housing having a condenser lens therein for condensing the light rays projected into and passed through the field of detection and a light receiving element in said housing for receiving the light rays condensed and focused thereon by said condenser lens to convert intensity of the light rays incident thereupon into an electric signal.

8. The optical sensor as defined in claim 7, wherein said light projecting prism has a right triangle shape whose hypotenuse forms the first surface.

9. The optical sensor as defined in claim 8, further comprising a reflection means for reflecting the collimated light rays from said light source means toward said first surface of said light projecting prism.

10. The optical sensor as defined in claim 8, further comprising a substantially triangularly shaped circuit board with a drive circuit for said light source means formed thereon, the triangularly shaped circuit board including a hypotenuse;

wherein said circuit board and said light projecting prism are disposed so that their respective hypotenuses face each other.

11. The optical sensor as defined in claim 10, wherein said light source means is positioned within a space in said housing spatially defined by a width of the second surface of said light projecting prism.

12. The optical sensor as defined in claim 11, further comprising light shielding means for shielding light rays from said circuit board, said light shielding means being disposed between said light source means and the first surface of said light projecting prism.

* * * * *